United States Patent
Tal et al.

(10) Patent No.: US 8,401,159 B2
(45) Date of Patent: Mar. 19, 2013

(54) DATA PROVISION TO A VIRTUAL PERSONAL ASSISTANT FOR HANDLING CALLS IN A COMMUNICATION SYSTEM

(75) Inventors: Oren Tal, Tel-Aviv (IL); Reuven Tal, Tel-Aviv (IL); James Taylor, Fullerton, CA (US)

(73) Assignee: On-Q Telecom Systems Co., Inc., Cheyenne, WY (US)

( * ) Notice: Subject to any disclaimer, the term of this patent is extended or adjusted under 35 U.S.C. 154(b) by 1319 days.

(21) Appl. No.: 12/114,615

(22) Filed: May 2, 2008

(65) Prior Publication Data
US 2008/0205608 A1    Aug. 28, 2008

Related U.S. Application Data

(63) Continuation-in-part of application No. 11/565,489, filed on Nov. 30, 2006, now Pat. No. 7,974,398.

(60) Provisional application No. 60/916,070, filed on May 4, 2007, provisional application No. 60/740,551, filed on Nov. 30, 2005.

(51) Int. Cl.
*H04M 11/00* (2006.01)

(52) U.S. Cl. .................. 379/93.01; 455/412.1

(58) Field of Classification Search .............. 455/426, 455/422; 370/260; 379/93.01
See application file for complete search history.

(56) References Cited

U.S. PATENT DOCUMENTS

| | | |
|---|---|---|
| 3,900,616 A | 8/1975 | Moore |
| 5,202,414 A | 4/1993 | Keller et al. |
| 5,206,895 A | 4/1993 | Danos |
| 5,301,351 A | 4/1994 | Jippo et al. |
| 5,341,412 A | 8/1994 | Ramot et al. |
| 5,400,661 A | 3/1995 | Cook et al. |
| 5,500,480 A | 3/1996 | Brown et al. |
| 5,601,097 A | 2/1997 | De Grandpre et al. |
| 5,709,414 A | 1/1998 | Bailey et al. |
| 5,815,566 A | 9/1998 | Ramot et al. |
| 5,904,339 A | 5/1999 | Flinn |
| 5,905,639 A | 5/1999 | Warren |
| 5,906,386 A | 5/1999 | Baker et al. |
| 5,909,584 A | 6/1999 | Tavallaei et al. |
| 6,003,204 A | 12/1999 | Roach et al. |

(Continued)

FOREIGN PATENT DOCUMENTS

| | | |
|---|---|---|
| EP | 2107817 | 10/2009 |
| JP | 59123357 | 7/1984 |

(Continued)

OTHER PUBLICATIONS

Repeat Dialing (*66) from http://www.bellatlanti..home/NY/Products/RDX-01, 2 pages.

(Continued)

*Primary Examiner* — Curtis Kuntz
*Assistant Examiner* — Maria El-Zoobi
(74) *Attorney, Agent, or Firm* — Leason Ellis LLP

(57) ABSTRACT

Uploading data to a call connection service by providing data records associated with a call destination in a user-selected manner. Navigation instructions are obtained concerning a particular data record in response to the data navigation instructions. An indication is received to upload the call destination associated with the particular record to the call connection service. In response to the indication, a routine is executed to acquire a portion of the data record and upload the portion to the call connection service in a format suitable for handling. Alternatively, data can be provided to the call completion service in an automated manner, including in response to an unconnectability condition detected during the call process, either during call initiation or after the call has been connected, and when calls are received at a secondary user device.

22 Claims, 8 Drawing Sheets

U.S. PATENT DOCUMENTS

| | | | |
|---|---|---|---|
| 6,005,830 | A | 12/1999 | Mukaida |
| 6,008,172 | A | 12/1999 | Broshi et al. |
| 6,026,079 | A | 2/2000 | Perlman |
| 6,081,725 | A | 6/2000 | Ishida |
| 6,102,250 | A | 8/2000 | Leo, Sr. |
| 6,105,464 | A | 8/2000 | Shimizu et al. |
| 6,108,543 | A | 8/2000 | Takahashi et al. |
| 6,201,578 | B1 | 3/2001 | Hosoya et al. |
| 6,246,872 | B1 | 6/2001 | Lee et al. |
| 6,407,736 | B1 | 6/2002 | Regan et al. |
| 6,553,221 | B2 | 4/2003 | Nakamura et al. |
| 6,804,509 | B1 | 10/2004 | Okon et al. |
| 7,106,851 | B2 | 9/2006 | Tang et al. |
| 7,450,931 | B2 * | 11/2008 | Alston .................. 455/412.1 |
| 2002/0021793 | A1 | 2/2002 | Shmuel et al. |
| 2003/0012149 | A1 * | 1/2003 | Maggenti et al. ............ 370/260 |
| 2003/0129978 | A1 * | 7/2003 | Akiyama et al. ............ 455/426 |
| 2007/0047695 | A1 | 3/2007 | Tal et al. |
| 2009/0143050 | A1 | 6/2009 | Ignatin |

FOREIGN PATENT DOCUMENTS

| | | |
|---|---|---|
| JP | 03235563 | 10/1991 |
| JP | 09162994 | 6/1997 |
| JP | 10322773 | 12/1998 |
| JP | 11027395 | 1/1999 |
| JP | 11098562 | 4/1999 |
| WO | WO-9905876 | 2/1999 |

OTHER PUBLICATIONS

Repeat Dialing from http://www.bellatlanti...home/NY/Products/RDX-01, 2 pages.

Comverse "Visual Voice Mail for Blackberry" Oct. 17, 2006 3 pages http://www.comverse.com/voicemail_and_videomail.aspx?domainId=29&productId=61.

International Search Report and Written Opinion of the International Searching Authority for PCT/US 08/62534 dated Sep. 14, 2008 (8 sheets).

International Search Report and Written Opinion of the International Searching Authority for PCT/US 06/61397 dated Nov. 20, 2007 (7 sheets).

* cited by examiner

DATA PROVISION TO A VIRTUAL PERSONAL ASSISTANT FOR HANDLING CALLS IN A COMMUNICATION SYSTEM

This application claims the benefit of U.S. Provisional Application Ser. No. 60/916,070, filed May 4, 2007, entitled "Providing a Destination to a Virtual Personal Assistant," and is a continuation-in-part of U.S. patent application Ser. No. 11/565,489, field Nov. 30, 2006, and titled "Virtual Personal Assistant For Handling Calls In A Communication System," which claims benefit under 35 U.S.C. §119(e) to U.S. Provisional Application Ser. No. 60/740,551, filed Nov. 30, 2005, entitled "Virtual Personal Assistant For Handling Calls In A Communication System," all of which are hereby incorporated by reference as though set forth in their entirety.

FIELD OF THE INVENTION

The present invention relates generally to the field of telecommunication services and, more particularly, to services for connecting a caller with a group of destinations.

BACKGROUND OF THE INVENTION

Many call establishment and call completion services are known and commonly used today. Call completion services attempt to facilitate completion of a failed communication attempt. Referring to FIG. 1, call completion services 100 can be broadly categorized into two major categories referred to as Caller in Charge of Call Completion Services (C4S) 101 and Destination in Charge of Call Completion Services (DC3S) 102.

One of the most popular of the DC3S 102 services is the voicemail service 110. Services such as voicemail can fulfill several purposes including call completion purposes. For example, voicemail may be used for the purpose of call completion when a caller leaves a message asking the destination to call the caller back. Voicemail can also be used for the purpose of simply conveying information to the destination.

Short Message Service (SMS) 111 is another service in the DC3S 102 category. Like voicemail service 110, SMS 111 can be used for the purpose of call completion when a caller sends a text message requesting the destination to call the caller back.

Yet another service in the DC3S 102 category is the "missed calls" service 112, which is integrated in a majority of handsets, and allows the destination to view a list of all callers that called while the destination was busy or available but not answering. A similar network service often referred to as the "who-called" or the "missed calls alert" service 113 allows the destination to receive a list of all callers that called while the destination was unavailable.

For services in the C4S 101 category, the caller maintains the responsibility of completing the call, rather than handing the responsibility to the destination. The main advantage of utilizing a service in the C4S 101 category is that the chance of a call actually being completed is much higher than with services in the DC3S 102 category since the caller in most instances is more committed to completing the call. The caller has a higher chance of completing the call with a service in the C4S 101 category since the destination may ignore a caller's initial efforts, be reluctant to accept expenses to complete the call, or otherwise communicate with the caller through a different information channel, such as through e-mail.

Services of the C4S 101 category can be further divided into two categories referred to as the C4S Call Back Services (CBS) 120 and the C4S Notify Back Services (NBS) 121.

Services in the NBS 121 category notify a caller at the first instance the desired destination is available or reachable. The caller may be notified via SMS or via other services, but not via an actual call. One big disadvantage of services in the NBS 121 category is that notifications are non-synchronized. For example, at the time the notification is attempted, the caller may be unreachable. Hence, by the time the caller receives a notification of the availability or reachability of the destination, the notification may already be out of date.

Services in the CBS 120 category actually call back the caller to prompt the caller to complete the call. Services in the CBS 120 category include the Call Back for an initially-UNReachable destination service (CBUNR) 130 and the Call Back for an initially-Non-AnSWering service (CBNASW) 131. These types of services in the CBS 120 category have been disclosed in U.S. Pat. No. 6,081,725 to Ishida, U.S. Pat. No. 6,804,509 to Okon et al., and U.S. Publication No. 2002-0021793 A1 to Okon et al. based on U.S. application Ser. No. 09/930,383, filed Aug. 14, 2001, each of which is hereby incorporated by reference in their respective entireties.

According to U.S. patent application Ser. No. 11/462,955 Method and System for Automated and Selective Determination of Call Completion Services" of Tal et. al., filed Aug. 7, 2006, which is hereby incorporated by reference in its entirety, a user of a telephone service is given the ability to configure call completion services. For example, the destination of incoming calls may enable or disable callback or voicemail services. In another example, the caller of outgoing calls may enable, disable, request or fail to request callback or voicemail services. If callback services are offered, the destination may also be given the option to reversibly enable or disable such services for incoming calls. As for outgoing calls, the caller has the inherent option of accepting or declining a call completion service offering. Nevertheless, a caller may be given an option to explicitly disable callback services for all outgoing calls and thereby bypass offerings for callback services during an outgoing call.

All aforementioned call completion services, however, require a caller wishing to connect with several destinations to activate a call completion service one at a time to each destination. There may be situations in which a caller wishes to plan ahead a series of calls to numerous destinations. For example, when a caller is going on a long drive, the caller may not wish to be distracted with the step of dialing each destination. In such situations, a caller may use a personal assistant or secretary to help the caller schedule outgoing calls. The use of personal assistants and secretaries for this function is common among high-ranking managers, executives, and others who can afford such assistance. Typically, a person who utilizes such an assistant is someone whose time is valuable and someone who wishes to minimize unnecessary distractions. To this end, personal assistants typically control the traffic of incoming and outgoing telephone calls. For example, an assistant can be given a list of persons to contact and be asked to reach each person one at a time and hand over successful calls to the assistant's supervisor.

Utilizing a personal assistant poses a tradeoff between maintaining a supervisor's privacy and increasing the assistant's effectiveness. For example, having an assistant sit in a supervisor's office makes the assistant very effective but breaches the supervisor's privacy. On the other hand, having the assistant sit outside the supervisor's office serves to better protect the supervisor's privacy but makes the assistant less effective. This tradeoff becomes more pronounced when the supervisor must be out of the office. The supervisor must choose between traveling with the assistant so that the assistant can be very effective and having the assistant remain at the office where the assistant is likely to be less effective.

Typically, most people cannot afford to employ a personal assistant or are reluctant to do so for various other reasons. Accordingly, personal assistants are rare. Furthermore, even when real personal assistants are employed, they exhibit numerous shortcomings. For example, when calls between a supervisor and a destination are unexpectedly terminated due to a lossy signal, power outage, or other interruptions of service, the supervisor must manually inform the personal assistant of the unexpected interruption so that the personal assistant can at a later time attempt to connect the supervisor with the destination again. Additionally, maintaining and tracking different lists of destinations, which can be reused at a later time, can be burdensome when changes to such lists must be coordinated between the supervisor and the personal assistant. Accordingly, utilizing a real personal assistant can be cumbersome. The end result is that most people allocate some or a lot of their own attention to call traffic control. For example, a person who does not utilize a personal assistant but wishes to be connected with numerous destinations will likely have to dial repeatedly until each destination becomes available.

One area where call initiation has been automated is in the field of call center technology. U.S. Pat. No. 5,341,412 to Ramot et al. entitled "Apparatus And A Method For Predictive Call Dialing" and U.S. Pat. No. 5,815,566 to Ramot et al. entitled "Apparatus And Method For Dynamic Inbound/Outbound Call Management And For Scheduling Appointments," which are hereby incorporated by reference in their respective entireties, describe an automatic dialer that performs "predictive dialing" to a list of destinations and hands-off each answered call to one of several idle representatives. The underlying assumption of this technique is that whenever a call is answered, an idle representative is able to take the call immediately, typically without having the destination wait for more than 1-2 seconds. Since this technique assumes that one of multiple callers is immediately able to connect with an available destination, this technique does not address the needs of a single caller wishing to connect with multiple destinations.

An individual caller cannot utilize such aforementioned techniques employed by call centers without modification since an individual caller must singularly receive all calls and since an individual caller is unlikely to be idle and immediately available to connect with each destination at every instance when a destination is available.

Another area where call initiation has been automated is in the field of predictive personal dialers, which perform a sequence of calls from a telephone directly and adjacently connected to a computer system. Just like the predictive dialing techniques employed by call centers, predictive personal dialers assume that the caller is nearby and immediately available to take a call when a destination answers. Hence, such systems are essentially for a stationary caller who is immediately available to take a call.

Accordingly, what is needed is a system and method that is tailored to allow a single caller who may not always be connectable, such as when the caller is on the move, to connect to a sequence of calls with multiple destinations.

SUMMARY OF THE INVENTION

In accordance with one aspect of the present invention, a method is provided for connecting a caller with a group of destinations. A destination list having a group of destinations is received and stored in a data store. Thereafter, an attempt is made to connect a caller with each of the stored destinations. In making each attempt, a connectability query is performed for a first party, wherein a party is either the caller or the destination to which an attempt is being made. If the first party is determined to be connectable, a second party (i.e., the other party) is called and offered a connection attempt to the first party. If the second party accepts, a call is made to the first party. If the first party is indeed connectable and answers the call, a connection is established between the two parties.

In yet another aspect of the present invention, attempts to connect the caller with each destination can be separately initiated or paused. In yet another aspect of the present invention, the destination list can be edited.

In yet a further aspect of the present invention, a system is provided for connecting a caller with a group of destinations. The system includes a data store and a plurality of modules, at least one of which has access to the data store. A first module receives a destination list having a group of destinations. A second module stores the destination list in the data store. Thereafter, a third module attempts to connect a caller with each of the stored destinations. The third module interacts with several other modules to determine the connectability of at least either the caller and one of the destinations and attempts a connection of the caller with the destination if at least one of them is determined as connectable.

In accordance with a further aspect of the present invention, a method for providing data to a call connection service through a user device interface is provided. The user is presented with one or more data records, each associated with a call destination. Navigation instructions are obtained from the user concerning a particular data record in response to the data navigation instructions. An indication is received from the user to upload the call destination associated with the particular record to the call connection service. A routine executes in response to the received indication which acquires a portion of the particular data record and processing it into a format suitable for handling by the call connection service. That portion of the information is uploaded to the call connection service in the format suitable for handling by the call connection service. In more particular aspects of this particular method, the user device provides a navigation interface to permit user-selection as to whether a selected data record is to be the subject of an immediate call attempt or one that is to be uploaded to the call connection service. Also, in more particular aspects of this particular method, the user device can have a processor so that the routine executes in the processor of the user device. Alternatively, the routine can execute in a processor associated with a network server that is in communication with the call connection service.

In yet another aspect of the present invention, a method for providing data to a call connection service in response to an unconnectability condition detected during a call process between a calling party and a destination party is provided. An unconnectability condition can be a dropped call or an unconnectable call. In accordance with this method, a call is initiated by the calling party to the destination party. An unconnectability condition is detected and actions are taken in response to the detection of the unconnectability condition. The action is taken on behalf of either the calling party or the destination party. The actions include obtaining a callback number and uploading the callback number to the call connection service.

In still another aspect of the present invention, a method for conducting a call connection service on a computer having a processor and executing code is provided. A user registers a plurality of telephone numbers in association with the user with the call connection service. One of the plurality of telephone numbers is established as a primary number. A remaining set of the plurality of telephone numbers is automatically set as a set of secondary telephone numbers. Incoming call data is received from one of the secondary telephone numbers and processed to identify information sufficient to initiate a return telephone call. The identified information is uploaded to the call connection service. Tests are made (e.g., periodically as a background process) for a trigger instruction at the call connection service from any of the registered plural telephone numbers. The call connection service is initiated so as to make the return telephone call in response to the trigger instruction.

These and other aspects, steps, and features of the invention will be apparent from the accompanying description of certain embodiments of the invention and the drawings discussed in connection therewith.

BRIEF DESCRIPTION OF THE DRAWINGS

The foregoing and other features of the present invention will be more readily apparent from the following detailed description and drawings of the illustrative embodiments of the invention wherein like reference numbers refer to similar elements throughout the drawings.

DETAILED DESCRIPTION OF CERTAIN EMBODIMENTS

Figure 1:
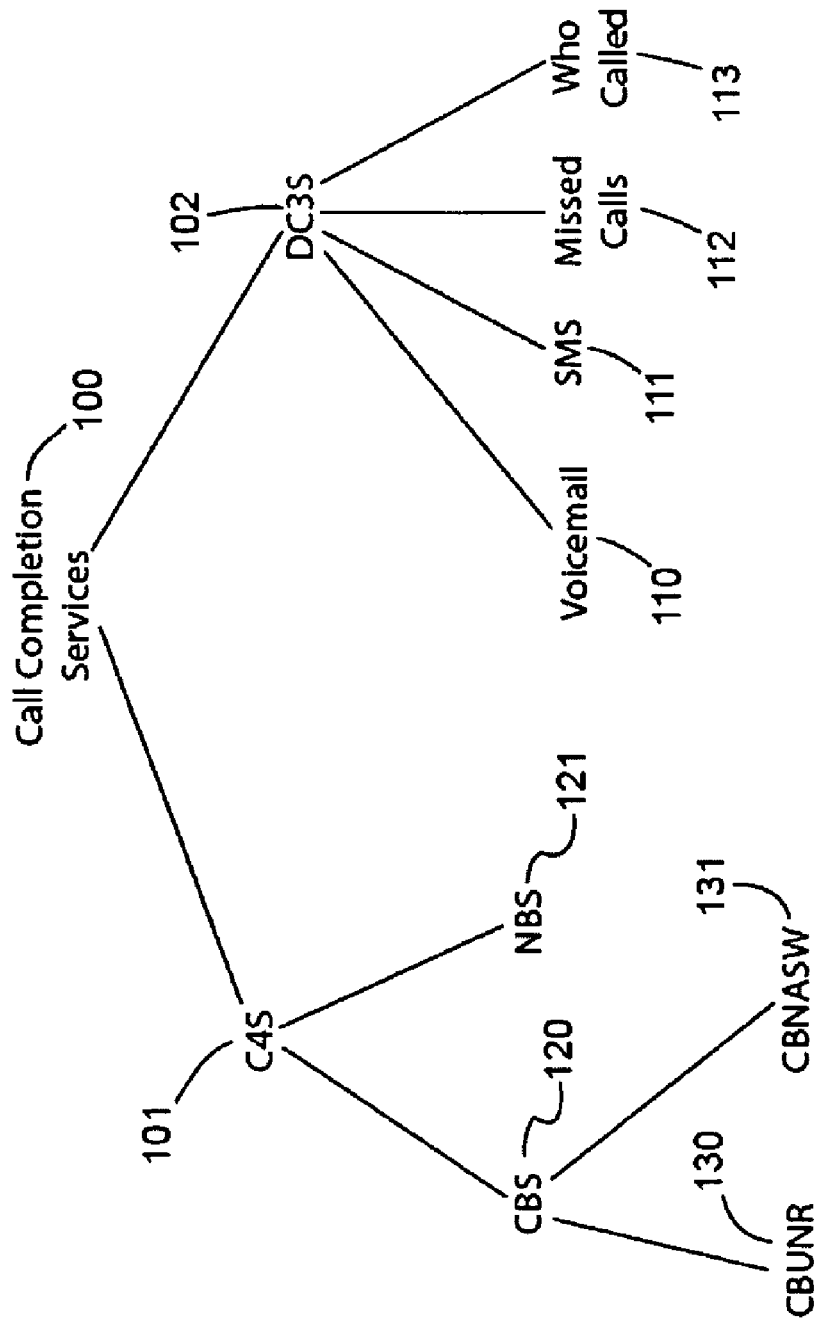
FIG. 1 illustrates various known types of call completion services.

By way of overview and introduction, the present invention comprises a method and system for sequentially connecting a caller with a group of destinations. A destination list having a group of destinations that the caller wishes to be connected with is provided to a Virtual Personal Assistant (VPA). Thereafter, the VPA attempts to connect the caller with each of the destinations in the destination list. Furthermore, the caller or an authorized user can schedule or trigger the VPA to initiate connection attempts at a specified time. Additionally, the caller or the authorized user can edit the destination list provided to the VPA, even after connection attempts have initiated. The destination list can vary in its format, but by way of example can include one or more data records associated with a number of destinations, and, more specifically, the data records can each comprise a contact record such as from an electronic address book, an electronic business card, or from some other document, image, or file, as described further below.

In attempting to connect the caller with each destination, the VPA offers a connection attempt to a first party, which is either the caller or the destination, and if that offer is accepted, the VPA initiates a call attempt to the second party. In order for the call attempt to succeed, the second party must be connectable. In many telecommunication systems, a party can be defined as being "connectable" if the party is not busy, available, and responsive to an incoming call. Prior to every call attempt, the VPA preferably queries whether the second party is connectable. By determining whether the second party is connectable, the VPA can refrain from offering the first party to make a futile connection attempt to a second party that is not connectable.

In different telecommunication systems or in communication modes different than the ones described above, however, the definition of "connectability" may vary according to the unique characteristics of those modes or systems. According to one example, in PTT (Push To Talk) communication mode it is generally assumed that every available party present on the network receives each communication burst. Therefore, the responsiveness criterion may not always be relevant to a "connectability" determination. According to a second example, a call-waiting feature may enable actual access to a party even when it is busy. Therefore, the busyness criterion too may not always be relevant to the "connectability" determination.

According to the present invention, a connectability query may include only part of the above-mentioned checks of the parameters busyness, availability and responsiveness. The decision as to which parameters should be checked may take as input different attributes of these checks such as the technical effort to be invested and the reliability of the determination. As will be explained in greater detail below, the result of such query isn't an absolute ruling but rather an assessment of the chance that the party will respond.

In determining whether a party is connectable, a check can be performed to determine if the party is not busy. For example, when a call is to a wireline or wireless phone, a party can be determined to be busy if the switch determines that it is engaged in another conversation.

Additionally, a check can be performed to query if the party is available in determining whether a party is connectable. For example, in the case of a cellular phone, a check can be performed to determine whether the phone is in a coverage area where there is a sufficiently strong signal to the phone, and whether there are allocable system resources such as voice channels available to make a call to the phone. Such checks can be performed, for example, by examining registration information of a cellular phone, by using SS7 probes, or by conducting handshake procedures. In another example, in the case of wireline phones, such phones can always be treated as being available. Thus, the check can include a determination as to the type of destination set (wireless device, wireline device) and actions can vary as a result of that check.

Furthermore, in determining whether a party is connectable, a check can be performed to query whether the party is responsive. Such a check can be complex with only a partial chance for providing a correct answer, whether it is positive or negative. Responsiveness indicates the party's willingness to answer an incoming call. Hence, making a determination about the responsiveness of a party can be very difficult. The responsiveness of a party for a call can be based on the recent history of the party's past responsiveness. For example, a party who recently finished a conversation can be assumed to be responsive. In another example, a party who did not recently answer a call from a particular caller can be assumed for a duration of time to be unresponsive to the particular caller.

A responsiveness determination for a specific destination can be made by monitoring the destination's activity in the network. For example, immediately after any action in the network attributable to the destination is detected, such as the ending of a call or sending or receiving of an SMS message, the destination can be assumed to be within the immediate vicinity of the destination's phone and not asleep or otherwise involved in a compelling activity.

A responsiveness determination for a specific destination can also be accomplished by monitoring different physical or environmental phenomena that are indicative of whether the destination is in the near vicinity of the destination's phone. These phenomena can be, for example, abrupt changes in the lighting conditions due to a lamp being turned on, changes in the electromagnetic field due to movement, or the like. These phenomena can be monitored by sensors, detectors, or devices, either internal or external to the communication device, such as a phone.

Sensors or detectors can be integrated as part of a wireline or wireless communication device to detect various phenomena. For example, a photoelectric diode can be integrated with a phone to measuring light changes. In another example, an electronic movement detector can be included with a phone to measure changes in the movement of the communication device. Additionally, an audio sensor can be included to detect whether the user of the communication device is listening to loud music, and therefore, indicate that the user is less likely to be responsive.

Additionally, sensors, detectors, or devices external to a wireline or wireless communication device can be installed especially for detecting various phenomena in the vicinity of the device. For example, such sensors, detectors, or devices can include a stress or movement sensor added to a chair, a photoelectric diode with a light beam (such as those used with elevators to detect movement), and audio sensors.

Additionally, sensors, detectors, or devices which already exist external to the phone can be monitored. For example, strikes on a keyboard or movements of a mouse on a computer can be monitored to identify whether a party is actively engaging in work and is less likely to be responsive to an incoming call.

Furthermore, a user of a phone can wear a device that communicates with a sensor, detector, or device attached or connected to a phone to communicate to the phone that the user is nearby enough to the phone to be alerted if the phone is ringing. Such approaches for identifying the proximity of a user to the phone can be used to measure responsiveness.

The responsiveness of a destination can be determined by monitoring one or more of the destination's physiological indices. For example, a steady heartbeat or monotone breathing may indicate that the destination is asleep and is likely to be unresponsive to an incoming call.

It should be noted that responsiveness determination is, in general, dependent on the technology incorporated with a communication device, such as a cellular handset. At the network level, there are only limited options for determining responsiveness. Such options are based mostly on the usage history or on user related information associated with a destination. User-related information can include, for example, information that the offices of a destination are closed on weekends and are therefore likely to reachable but not-answering (R/NA) during those periods.

In many instances, a query of whether a party is connectable does not produce an absolute determination. Rather the query produces a result indicating the likelihood or probability of a call attempt succeeding. In general, a query may include all of the above mentioned checks or only one of them. For example, a check to determine whether a party is not busy can be the only check performed in a query for the connectability of a party. The query, therefore, is inherently more reliable as a measure of unconnectability than as an indicator of connectability since even a simple check to determine whether a party is busy can conclusively indicate unconnectability. Accordingly, the query provides a probabilistic indication of the chances for a call completion and serves as a filter to reduce the probability of failed connection attempts. Therefore, one embodiment of the present invention can include configurable parameters that indicate which checks are to be performed and which thresholds should be compared against to determine whether a party is connectable.

Accordingly, an embodiment of the present invention queries the connectability of a first party and offers to connect a second party with the first party. If the second party accepts the offer, a connection attempt is made to the first party. If the first party is indeed connectable and answers the call, a connection is established between the first party and the second party.

The VPA can query whether the caller is connectable before offering a connection to the destination, or query whether the destination is connectable before offering a connection to the caller. Preferably, connectability checks are conducted and completed prior to issuing a ring signal so that neither the caller nor the destination, as the case may be, is interrupted by this action. In other words, the connectability test in this regard is silent to the checked party.

Figure 2:
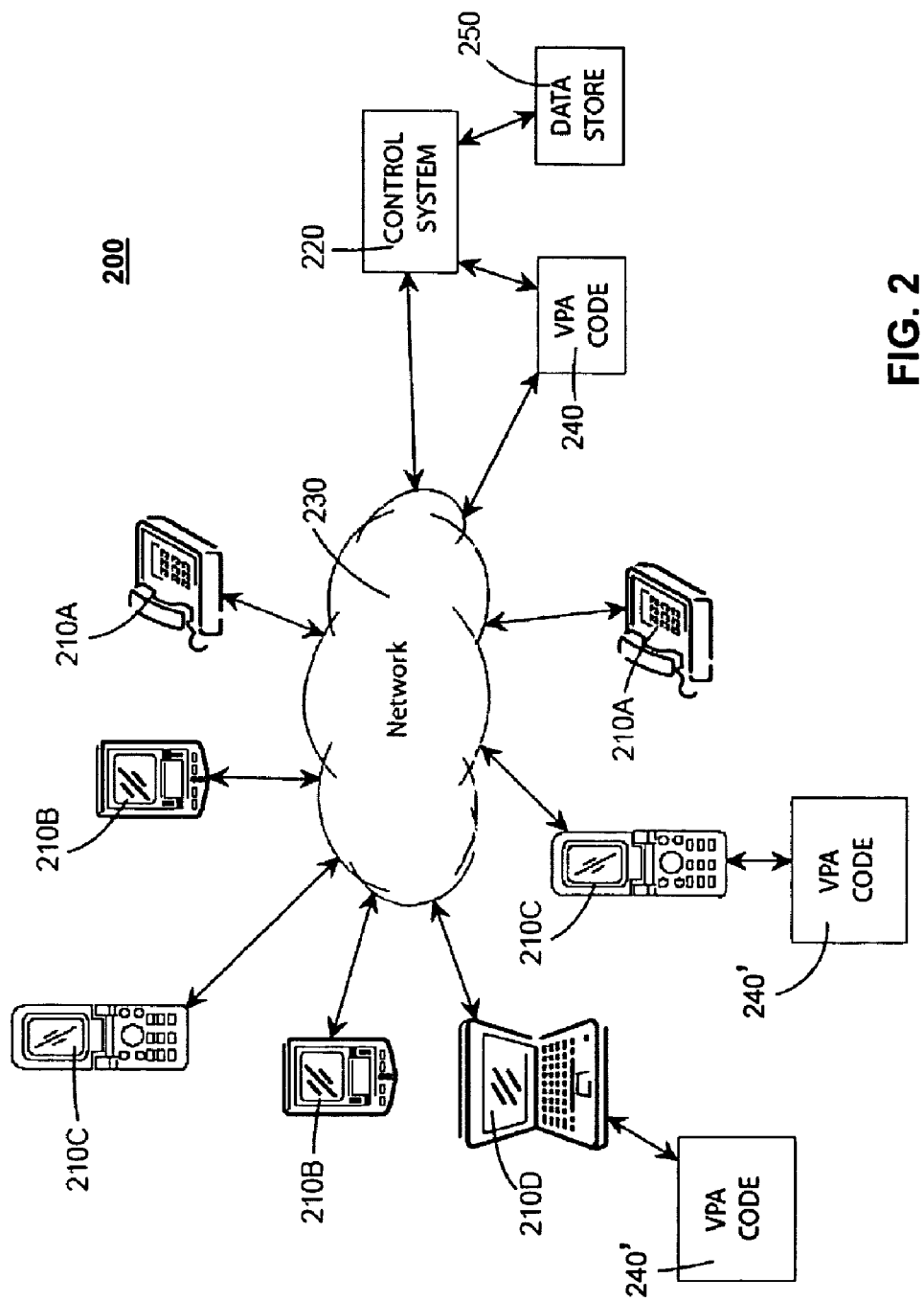
FIG. 2 depicts a high-level diagram of a communication system in which an embodiment of the present invention can be implemented.

FIG. 2 depicts a high-level diagram of a communication system 200 in which an embodiment of the present invention can be implemented. Communication system 200 includes a control system 220 connected to multiple user devices 210A-210D over network 230. User devices 210A-210D can include various types of communication devices, such as, for example, landline telephone 210A, PDA 210B, cellular phone 210C, and personal computer 210D. Control system 220 is capable of handling, managing, detecting, and/or initiating calls between user devices 210A-210D.

Furthermore, while control system 220 is shown connected to user devices 210A-210D over the same network, it will be appreciated by persons skilled in the art that control system 220 can include multiple network interfaces to communicate with user devices 210A-210D on various and disparate networks.

The present invention can be implemented in control system 220 or as part of a user device, such as user devices 210A-210D. When implemented in control system 220 or as part of a user device, the implementation includes a processor, VPA 240 and data store 250. VPA 240 performs various functions in accordance with the present invention such as, for example, receiving a destination list, storing the destination list in data store 250, and attempting to connect a caller with the destinations in the destination list. Data store 250 stores various data utilized by VPA 250 including, for example, the destination list. Data store 250 can be any device that can store information and is capable of being accessed by a software module executing on a processor such as, for example, Random Access Memory (RAM), hard drive, flash memory, or a database.

When the VPA is embodied separately from a user device, such as on control system 220, the VPA can provide additional capabilities. By having the VPA embodied remotely from a user device, a user can interact with the VPA from various user devices even while the VPA attempts to connect the caller with each destination on the destination list. For example, a caller might prefer to use different handsets having different phone numbers at different points in time during the day. The caller may wish to use a residential phone during the mornings and evenings, an office phone during the day, a portable phone during lunch, and a car phone while commuting. By embodying the VPA on a server such as a control system 220, the VPA can advantageously communicate with various user devices that are accessible to the caller to complete calls to each destination of a destination list.

Furthermore, having the VPA embodied separately from a user device, such as on control system 220, allows several users to share one or more destination lists or allow other users to modify the destination list. For example, if a member of a sales force is sick, another member of the sales force can borrow a customer destination list of the sick colleague to communicate with all the customers.

Additionally, a VPA embodied on a server in a network, such as control system 220, can be more easily upgraded and supported since resources on a user device, such as memory and CPU power, are usually much more limited than resources dedicated to a server. Furthermore, a VPA embodied on a communication network can be more knowledgeable with regard to the reachability of different users than a VPA embodied on a user device. Accordingly, a VPA embodied on a communication network can provide functionality in accordance with the present invention with fewer failed connection attempts.

VPA 240 can comprise computer code executing on a processor of the control system 220 or a processor of a user device, or can comprise a server or other computational machine loaded with software or having firmware configured to perform the functions noted above. VPA 240 also can be embodied as a plurality of software modules executing on a processor. Additionally, the VPA can be implemented in a distributed manner across multiple processors. As will be appreciated by persons skilled in the art, a software module includes anything that can be executed by a processor of a computer such as, for example, compiled code, binary machine level instructions, assembly code, source level code, scripts, function calls, library routines, software objects and the like.

It should be noted that for convenience and brevity, any communication attempt, such as, for example, a phone call, an internet voice communication, a VoIP communication, an instant message, or a communication bridging multiple services shall be referred to as a "call." Additionally, any person or machine performing such attempt shall be referred to as a "caller," and any person or machine who is the intended target or intended recipient of such attempt shall be referred to as a "destination." As the varying communication networks mature, the delineation between the communication services become blurred. Furthermore, non-telephonic communication systems have begun offering similar sets of services including analogous forms of away messages, voicemail, and ring-back. The caller and destination need not be using the same communication service. For example, a VoIP phone can easily communicate with a cellular phone 210B or landline telephone 210A through network 230. Similarly, instant messages can be sent and received on cellular phone 210C as well as on computer 210D.

It should further be noted that caller and destination are not limited to people. Rather, the caller and destination can be a person, a general purpose computer, a specific-purpose machine, or a combination thereof. For example, machines and computers are frequently used to place and receive automated calls for marketing or customer service. In the case of customer service answering system, the destination is typically a computer, which provides a series of prompts to identify the correct person to forward the call. Similarly, telemarketing calls are frequently placed by a machine to multiple phones simultaneously. As the telemarketing calls are answered, the computer placing the calls forwards the call to a live person to talk to the destination. Thus, a user can establish VoIP calls using personal computer 210D and likewise, personal computer 210D can automatically place or receive calls.

Referring to FIG. 2, a destination list can be edited and provided to VPA 240 utilizing an interface on a communication user device such as user devices 210A-210D. Editing a destination list refers to preparing a first version of the destination list as well as any subsequent revisions. For example, a destination list can be input and provided to the VPA from cell phone 210C or PDA 210B by keying numbers in a particular sequence or by selecting phone numbers already stored in cell phone 210C or PDA 210B. The various data stored on a cellphone (e.g., address book, call history, voicemails, and text messages (i.e., SMS), etc.) can be automatically or interactively transferred to the VPA, as discussed further with respect to FIGS. 5 and 6. In another example, the destination list can be edited and uploaded to a remote VPA operating on control system 220 from a personal computer 210D.

A separate user device can be used for editing a destination list, providing the destination list to the VPA, and receiving calls to connect with destinations. Allowing each of these functions to be performed separately allows for maximum flexibility. For example, before going on a long drive, a caller can prepare a destination list and upload it to a remote VPA using personal computer 210D. Later, while in the car, the caller can use cell phone 210C to trigger the VPA to initiate connection attempts to the destinations and receive successful connections on cell phone 210C.

Furthermore, for each connection attempt, the VPA can attempt a connection among different combinations of user devices, such as user devices 210A-210D, based on the connectability of a particular user device to the caller or the destination. For example, during a first attempt, the VPA can attempt to connect a caller on cell phone 210C with a first destination on landline 210A. After the first attempt fails, the VPA can attempt to connect the caller on cell phone 210C with the first destination's cell phone 210C. Once the connection between the caller and the first destination has terminated successfully, the VPA can attempt to connect the caller on PDA 210B with a second destination on personal computer 210D. Accordingly, when the VPA connects the caller with each destination on the destination list, some calls can be conducted from the caller's office phone, others from the caller's car phone, others from the caller's cellular handset and yet others from the caller's home phone.

An electronic calendar can be provided (e.g., configured and/or linked) to a VPA from a user device. Today, many people use an electronic calendar to assist them in managing their time efficiently. An electronic calendar typically contains information about the user's activities, whereabouts, availability, and the like, stored in one or more files or in more parseable formats. Once provided to a VPA, the VPA can use the calendar information to make connection attempts only at times when the caller is available. For example, the VPA can use a caller's calendar information to refrain from making connection attempts when the caller is in a meeting. Accordingly, by synchronizing the VPA with the caller's electronic calendar, the caller can inform the VPA the times or types of activities during which the caller is available or is unavailable without separately keying calendar information to the VPA module.

An interface on a user device, such as on user devices 210A-210D, can be utilized to furnish additional parameters to direct the manner in which the VPA attempts connections. For example, for each destination in the destination list, a caller can specify a time frame in addition to the destination's identity and number. The time frame instructs the VPA of the time periods during which a connection can be attempted to a destination. For example, the time frame can indicate the earliest and the latest time to attempt a connection. In another example, the caller can specify a condition for each destination in the destination list. When a condition is specified, the VPA waits until the condition is satisfied before attempting to make a connection with the destination. For example, a caller can specify a condition so that the caller does not get connected with the caller's boss until the caller has been connected with several of the caller's customers. In another example, the caller can condition a connection attempt to a destination based on a successful completion of an incoming call from another caller (to the caller) who may or may not be included in the caller's destination list. Furthermore, the caller can instruct the VPA to enable or disable various preferences for dealing with call completion services that may be initiated when the VPA attempts to connect the caller with a destination that is not available. For example, a caller can instruct the VPA to register the caller with a call-back service when such a service is offered by a destination.

All information that can be provided to a VPA can be input directly to the VPA when the VPA is implemented in a user device such as user devices 210C-210D as VPA 240'. When a VPA, such as VPA 240, is implemented as part of a control system, such as control system 220, all information can be provided to the VPA by uploading the information over a network such as network 230. All information can be input or uploaded in one batch or in several batches. Optionally, information can be retrieved from the various data storage systems of the communication device (e.g., cellphone 210C or phone 210A) and selectively uploaded to or synchronized with the VPA control system 220.

Furthermore, information stored at the VPA can be accessed and edited from time to time by the caller from the user device. In accordance with one aspect of the present invention, the user device can download a portion or all of the data stored at the VPA to the user device so that the user device can edit the information and then upload it to the VPA. Alternatively, the user device can access or view the data stored at the VPA and directly edit the data on the VPA. Direct data edits can be performed by modifying the VPA data as the edits are made, or, to ensure data consistency, data can be modified in a transactional manner, such as by creating a duplicate data record which is committed to the VPA data storage once all user edits are made.

A caller can specify several user devices, such as user devices 210A-210D, as origins or destinations of any call. An entry in the destination list can provide information about a single destination such as the destination's name and contact information for multiple user devices that are accessible to that destination.

Additionally, a caller can authorize another user to prepare or edit a destination list. For example, a caller can authorize the caller's spouse, assistant, business partner, or any other delegate to edit the caller's destination list previously provided to a VPA.

Several destination lists can be provided and stored with a VPA. A destination list typically specifies a group of destinations and the order in which the caller wants to be connected with each destination. But, a destination list can also specify a group of destinations that the caller wants to be connected with in any sequence. Furthermore, a single destination can appear in multiple destination lists. For example, a particular destination can appear in both the caller's "family destination list" and in a "golf buddies destination list." When a destination list is provided to the VPA, the destination list can be accessed at a later time and edited through a user device such as user devices 210A-210D. Additionally, a destination list can be archived and re-used by the caller at a later time.

Once a destination list is provided to (e.g., configured and/or linked) a VPA, the VPA can be triggered or directed to initiate attempts to connect a caller with each destination on the destination list. The VPA can be triggered according to a user's preference or if no preference is specified, by a system default preference. For example, a caller can instruct the VPA that the caller wishes to trigger the VPA as soon as possible to cause the VPA to initiate connection attempts as soon as the first destination in a destination list is provided. In another example, the caller can trigger the VPA after a destination list has been provided to the VPA and revised by an assistant. In yet another example, the caller can provide a destination list to the VPA and wait until the caller has some free time before triggering the VPA. The VPA can be triggered by utilizing a user interface on a user device, such as on user devices 210A-210D, to provide an indication to the VPA that call attempts should be initiated. If the VPA is centrally located such as VPA 240, the trigger comprises an instruction communicated from a user device over the network, such as network 230, to the VPA.

Even after the VPA is triggered, the destination list can be modified by a user, by another person authorized by the user, or automatically by the VPA. For example, a user can add or exclude destinations from the destination list. In another example, an incoming call from a destination in the destination list can cause the VPA to automatically exclude the destination from the destination list. In other words, the call from the destination has identifying information (e.g., an automatic number identification (ANI), an email address, etc.) that can be matched to the destination list contents and then marked as excluded or removed from the list. Additionally, a destination that is unavailable for a user specified period of time can also be automatically excluded from the destination list. A user can utilize an interface on a user device, such as on user devices 210A-210D, to configure the VPA for automatically modifying a destination list.

Furthermore, a user can configure a VPA to pause for an interval between the termination of a successful connection and an attempt to establish another connection. A pause between connections allows a caller to rest, receive incoming calls, and initiate outgoing calls in between connection initiated by the VPA. By utilizing an interface on a user device, the caller can specify an interval or a time period for which the VPA will pause between the end of one call and the start of connection attempts to establish another call. Furthermore, a user can utilize an interface on a user device to pause indefinitely the operation of the VPA. When the user is ready to utilize the VPA again, the user can cause the VPA to resume its operation by providing a command through an interface on the user device. While the VPA is paused, a user can access, modify or delete a destination list.

When a VPA attempts to connect a caller with a destination, the VPA initiates a call to the caller and a call to the destination and connects the caller and destination if both are available. But, at the time the VPA attempts to connect the caller and the destination, there is no certainty that the caller or the destination will be available to answer a call. The destination can be unreachable or ringing but not answering (R/NA). The caller too may be temporarily out of a coverage area necessary for the caller's user device or the caller may be physically away from the user device. Therefore, situations can occur when the caller or the destination can be burdened with answering a call in vain. Moreover, even when both the caller and the destination are available, they are unlikely to answer at the same time, and therefore, one will have to wait for the other to answer. Depending on the implementation, one party will be burdened more often by futile connection attempts and waiting times.

In an embodiment, referred to as "caller-first," the VPA queries whether the destination is connectable prior to calling the caller. If the caller answers, the VPA offers the caller with an option to be connected to a destination who is identified by the destination's name, number, a special tone, or by some other identifier. If the caller declines to accept the option, an attempt to connect the caller with the destination is postponed to a later time. Once the caller accepts the offer, the VPA attempts to connect the caller to the destination. If the destination answers, the caller and the destination are connected. If the connection attempt is ultimately found to be futile because the destination is unreachable or R/NA, the caller can manually activate a call completion service available at the destination. An exemplary process 300 for implementing an embodiment of the present invention that is "caller-first" is described below with reference to FIG. 3.

In another embodiment, referred to as "destination-first," the VPA queries whether the caller is connectable prior to calling the destination. If the destination answers, the destination is advised to remain on the call to be connected with the caller. In some respects, this type of embodiment is better than the "caller-first" embodiments because generally the caller who initiated the VPA is likely to be more responsive and accessible than the destination. Hence, "destination-first" embodiments are likely to have less connection attempts fail than "caller-first" embodiments. But in other respects, the "destination-first" embodiments can be more cumbersome than "caller-first" embodiments since it requires a destination, who is typically the party less enthusiastic to have a call, to remain online and wait for the caller to respond to the call. In some instances, the destination can become annoyed and even hang-up or disconnect the call. However, in situations where the caller is of a higher rank in an organization than the destination or the caller is an important customer of the destination, the destination may be willing to wait for the caller to answer. In another example, a "destination-first" embodiment may be appropriate for a caller who is a dispatcher that routinely needs to make a call sequence to field representatives. If the representatives are aware that a "destination-first" calling sequence will make the dispatcher's job much easier, the representatives may be more forgiving and accept waiting for the dispatcher to become available. An exemplary process 400 for implementing an embodiment of the present invention that is "destination-first" is described below with reference to FIG. 4.

In yet another embodiment, referred to as "ring-both," the VPA determines if the caller and the destination are connectable concurrently, and then starts to ring both the caller's phone and the destination's phone at the same instance or nearly so. Since the caller and the destination are unlikely to answer their respective calls at the exact same time, the party picking up the call first will have to wait for the other party to answer. If the caller responds first, the process of connecting the caller with the destination is handled in the manner of a "caller-first" embodiment. If the destination responds first, the process of connecting the caller with the destination is handled in the manner of a "destination-first" embodiment. The "ring both" embodiment may be at certain circumstances more favorable than the "caller-first" and "destination-first" embodiments since the expected waiting time for each party is reduced and is statistically split between both parties. For a recurring call, splitting up the waiting times between the parties may appear as being fairer than the "caller-first" or "destination-first" embodiments.

In all of the "caller-first", "destination-first" and "ring-both" embodiments described above, unfavorable "false alarm" occurrences may occur. A "false alarm" happens when, even though parties were primarily determined as connectable, at the actual connection attempt one of the caller and the destination are in fact unreachable or ringing but not answering (R/NA) and the connection attempt subsequently fails, causing an unwanted disturbance to the first party online.

Due to the probabilistic nature of the connectability queries these "false alarm" occurrences are sometimes unavoidable; however, it is important to reduce the occurrence of false alarms whenever possible. Specifically, multiple consecutive occurrences of false alarms should preferably be avoided, since similar circumstances may continue to occur. Obviously, a recurring "false alarm" is disruptive to the user. As a preventive measure, after a single "false alarm," the VPA may revert to performing a more rigorous set of tests, that should reduce the chance of a consecutive "false alarm". For example, more "expensive" resources, that were spared in the primary query, may be used in these reassessment procedures. Optionally, "silent" connectability checks are performed to eliminate false alerts. Such connectability checks are described in the aforesaid '509 patent to Okon et al. as availability checks that pause before sending a ring signal.

When the destination is unavailable in a "caller-first" embodiment, the caller is given the option of calling the destination again at a later time manually or by utilizing the VPA once more. Alternatively, the caller can choose to apply for a call completion service available for the destination in the manner the caller would apply for such a service if the caller had made a call manually to the destination.

When the destination is unavailable in a "destination-first" embodiment, the VPA can take one of several actions based on the user's configuration of the VPA. For example, the VPA can be configured to periodically check the connectability of the destination until the destination is available. In another configuration, the VPA can skip an unavailable destination and attempt to connect the caller with another destination in the destination list. Furthermore, in another configuration, the VPA can mark an unavailable destination in the destination list as being removed from further connection attempts. Additionally, the VPA can demote an unavailable destination so that further attempts to connect to the destination will occur only after connection attempts have been made for a certain number of other destinations in the destination list. If the VPA reaches the end of the destination list and there are unreachable or not answering destinations remaining on the destination list, the VPA can be configured to attempt connecting the caller with those unavailable destinations once more or periodically.

The VPA can be configured to automatically accept or deny offers for call completion services when a destination is unconnectable. Through an interface on a user device, such as on user devices 210A-210D, the user can specify to the VPA how it is to interact with each particular call completion service. For example, by utilizing an interface to the VPA through a user device, the caller can pre-record a voice message that can be used by the VPA to leave a voicemail automatically with unconnectable destinations. Additionally, the user can specify with the VPA a preference for which call completion services should be accepted. The user can specify such a preference in general, for a particular destination list, or for each destination in a destination list. Hence, a caller who must inform several employees and golf buddies that the caller is not available to work or to play golf can create a destination list and specify separate call completion service preferences for each of the caller's employees and golf buddies. The caller can specify that a pre-recorded voice message be left for unreachable or un-answering employees to notify such employees that the caller will be out of the office. The caller can specify that a callback service be requested for unreachable or un-answering golf buddies so that the caller can negotiate another time to play golf. Once the caller specifies such a destination list and preferences for call completion services with the VPA, the VPA will accordingly apply for any such call completion offerings. In one embodiment, the aforementioned system described in U.S. patent application Ser. No. 11/462,955 can be utilized in accordance with the present invention to implement the functionality of automating acceptance or denial of call completion service offerings.

If the VPA accepts a call completion service offering for an unavailable destination, the destination is either permanently or temporarily marked in the destination list as being removed for further connection attempts by the VPA. If a call completion service offering transfers the call completion responsibility to the destination, such as with voicemail or "who called" services, the destination is permanently marked as being removed from further connection attempts by the VPA. If the call completion service offering only temporarily transfers the call completion responsibility to the destination, such as with a notify-back service or a call-back service, the destination is only temporarily marked as being removed from further connection attempts by the VPA. A temporarily removed destination can be re-inserted into the call sequence if, for example, a notification arrives from a notify-back service indicating that the destination is reachable. In another example, a temporarily removed destination can be re-inserted into the call sequence if the VPA detects that a request for a callback service to a destination has been aborted.

The VPA can be configured to filter incoming calls according to a user's preferences. For example, a caller can configure the VPA to make the caller reachable to different groups at different times. This sort of functionality can be implemented in conjunction with the concepts taught in the aforementioned U.S. patent application Ser. No. 11/462,955 for enabling and disabling call completion services.

Figure 3:
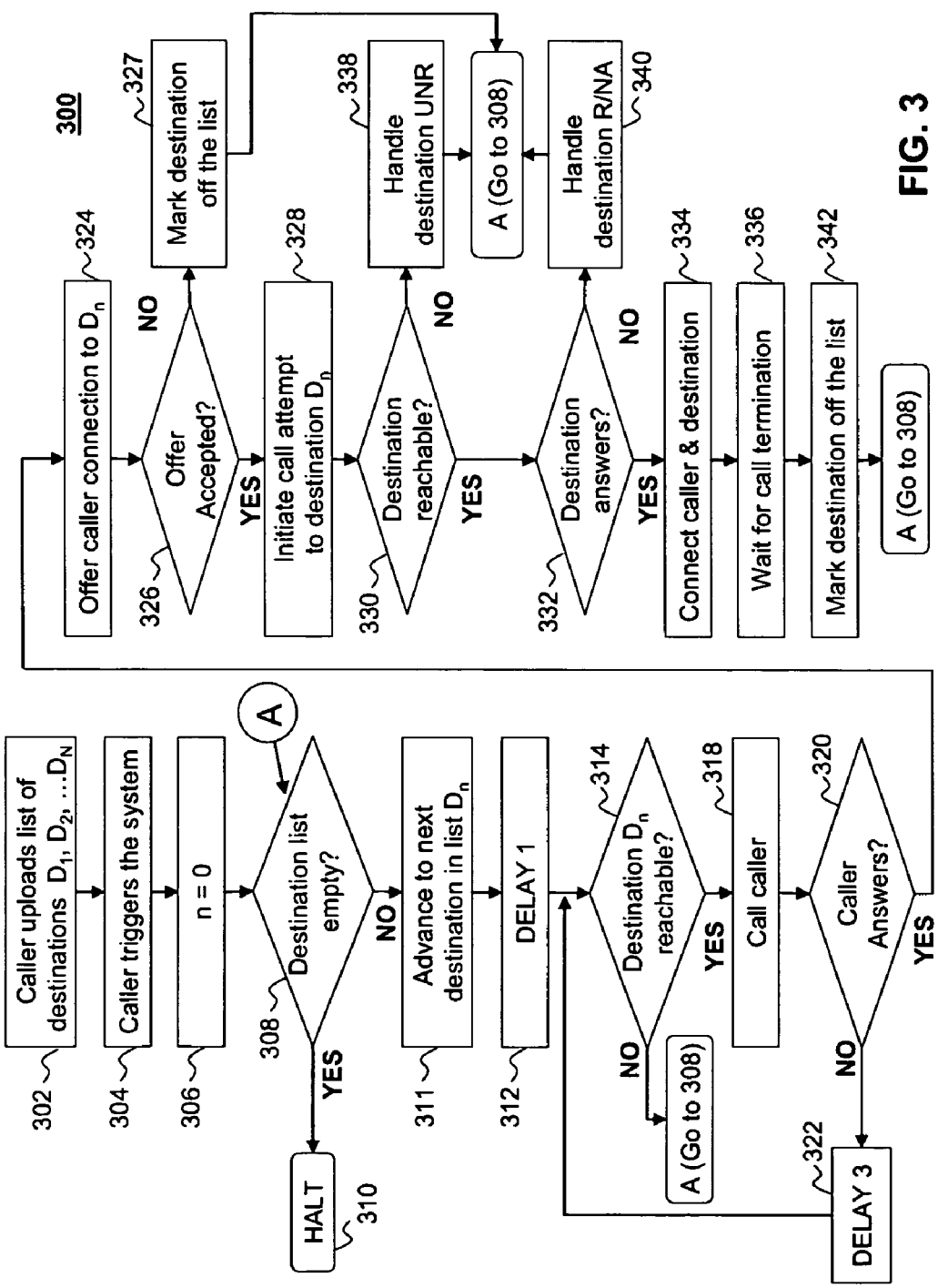
FIG. 3 depicts a flow chart illustrating a process for connecting a caller with a group of destinations wherein the connectability of the caller is determined first, in accordance with an embodiment of the present invention.

Referring now to FIG. 3, a process 300 for connecting a caller with a group of destinations is provided. Process 300 determines if the caller is connectable first prior to determining if a destination is connectable when attempting to connect the caller with the destination. Process 300 can be implemented as a part of a VPA.

In step 302, a destination list having a group of destinations is received. For example, when process 300 is implemented in a VPA, such as VPA 240, a caller can utilize an interface on a user device such as on a personal computer 210D to upload a destination list to the VPA, which is executing step 302 of process 300 to receive the destination list. As described above, once the destination list is received by the VPA, it is saved in a data store and can be further edited by the caller or a delegated user. Alternatively, the destination list can be made available to a local VPA 240'.

In step 304, an indication is received to initiate attempts to connect the caller with each destination in the destination list. For example, a caller can trigger the VPA implementing process 300 by entering a command or instruction through an interface on a user device such as on a cell phone 210C.

In step 306, a list pointer (n) is set to zero. A value of zero for the list pointer indicates that no attempts have yet been made to connect the caller with a destination. When the list pointer is set to a value x other than zero, the list pointer refers to the destination which is listed at position x in a destination list. As process 300 attempts to connect a caller with each destination sequentially in the order listed in the destination list, the list pointer is conveniently used to refer to the current destination in the call sequence as specified in the destination list. Other software constructs can be used to index the destination list as understood by persons of skilled in the art.

In step 308, a check is performed to determine if there are any remaining destinations in the destination list that needs to be connected with the caller. If the destination list is empty (in the sense that there are no more destinations to be connected with the caller), process 300 ends at step 310. Otherwise, process 300 continues to step 311.

In step 311, the list pointer is incremented until the list pointer references the next sequential destination in the destination list that needs to be connected with the caller. If the list pointer in incremented beyond the last entry of the destination list, the list pointer is set to zero, in a cyclic manner, and incremented sequentially until the list pointer refers to the next destination in the sequence that needs to be connected with the caller. Upon completion of step 311, the list pointer refers to the current destination for which attempts will be made to connect with the caller.

In step 312, process 300 pauses for a specified period of time, referred to as Delay 1, to enable the caller to rest and handle incoming calls and additional outgoing calls. Such incoming calls may be a result of a callback service such as a CBUNR or CBNASW service that was initiated for an unreachable or unavailable (R/NA) destination. The time period for Delay 1 is configurable by the caller utilizing an interface on a user device, and can include a no delay value. The pause at step 312 can be a loop that waits for a command received at the user interface to proceed with placing a call to the next destination in the destination list.

In step 314, a check is performed to detect whether the current destination is reachable. One system that checks for whether a recipient of a call is reachable is described in U.S. Pat. No. 6,631,270 to Dolan, which is hereby incorporated by reference in its entirety. In the system described by Dolan, a call to a wireless device can be identified as being unreachable when congestion is detected in the cell sites necessary to complete the call. Such an approach can be utilized in accordance with the present invention to identify situations when a caller or a destination is unreachable. Alternatively, the approach described in U.S. Pat. No. 6,804,509 to Okon et al. can be used for silent availability checks. If the current destination is reachable, process 300 continues to step 318. Otherwise, process 300 continues to step 308.

In step 318, a call is placed to the caller. In an embodiment, a call is placed with a unique predefined indication such as, for example, a unique ring tone, to differentiate the call from regular incoming calls.

In step 320, process 300 determines whether the caller has answered the call. If the caller answers, process 300 proceeds to step 324. Otherwise, process 300 pauses in step 322 for a specified period of time, referred to as Delay 3, before performing another check in step 314 to determine if current destination is reachable. The time period for Delay 3 is configurable by the caller, as described above.

In step 324, an offer is made to the caller to connect with the current destination. The destination is identified to the caller by phone number, name, or any other identifier.

In step 326, a check is performed to determine if the caller has accepted the offer made in step 324. If the offer has been accepted, process 300 proceeds to step 328. Otherwise, the current destination is marked in the destination list as being removed from additional connection attempts in step 327 and process 300 continues to step 308.

In step 328, a call attempt is initiated to the current destination. Steps 330, 332, 334, and 336 of process 300 represent different phases of the call attempt initiated in step 328.

In step 330, a check is performed to detect whether the current destination is reachable. For example, a current destination is reachable if the call attempt initiated in step 328 is detected as being routed to the destination's phone or reachability can be the result of the test performed at step 314. If the current destination is reachable, process 300 continues to step 332. Otherwise, process 300 handles the situation of an unreachable destination in step 338 utilizing one of the various techniques aforementioned with regard to unreachable destinations. For example, the caller can manually apply for a call completion service such as voicemail or have the VPA executing process 300 automatically apply for a call completion service as described above. Furthermore, as described previously, the current destination can be permanently or temporarily marked as being removed for further connection attempts. After step 338, process 300 continues to step 308.

However, if the current destination is reachable, then the call attempt will be routed to the destination and the current destination's phone, for example, preferably will only then start ringing. In step 332, a check is performed to determine if the destination has answered the call attempt. Optionally, the caller can monitor or listen to the call as it is being placed to the current destination, for example, when the call is a telephone call.

If the current destination answers the call attempt in step 332, process 300 proceeds to step 334. Otherwise, process 300 handles the situation of a ringing but not answering (R/NA) destination in step 340 utilizing one of the various techniques mentioned above with regard to reachable but not answering destinations. For example, an R/NA destination can be handled similarly to the manner in which an unreachable destination is handled as described above in step 338. Thereafter, process 300 proceeds to step 308.

In step 334, the caller and the current destination are connected to allow the caller and the destination to communicate with each other. The caller and the current destination can be connected, for example, by relaying the caller's communication to the destination and vice versa.

In step 336, process 300 waits for the call between the caller and the destination to terminate. For example, process 300 can monitor the connection between the caller and the destination and wait until a disconnect is detected. Optionally, a disconnect due to a loss of service or other interruption can mark the destination on the destination list for an immediate subsequent call connection attempt. In step 342, the current destination is marked on the destination list as no longer requiring any further attempts to be connected to the caller if the call termination was not due to the loss of service, power, and other similar interruptions. Thereafter, process 300 proceeds to step 308.

After each of the destinations in the destination list has been processed by process 300, any destination that was unreachable or unavailable (or reachable but having the connection lost during the call) and not properly or fully handled by a call completion service can be re-marked as requiring additional connection attempts at step 308 at the direction of the caller. Thereafter, process 300 continues to step 311 to subsequently retry such destinations. A destination that was unreachable or non-answering may not have been properly handled by a call completion service, for example, if the destination did not offer any call completion services or offered only call completion services that were unacceptable to the caller.

Figure 4:
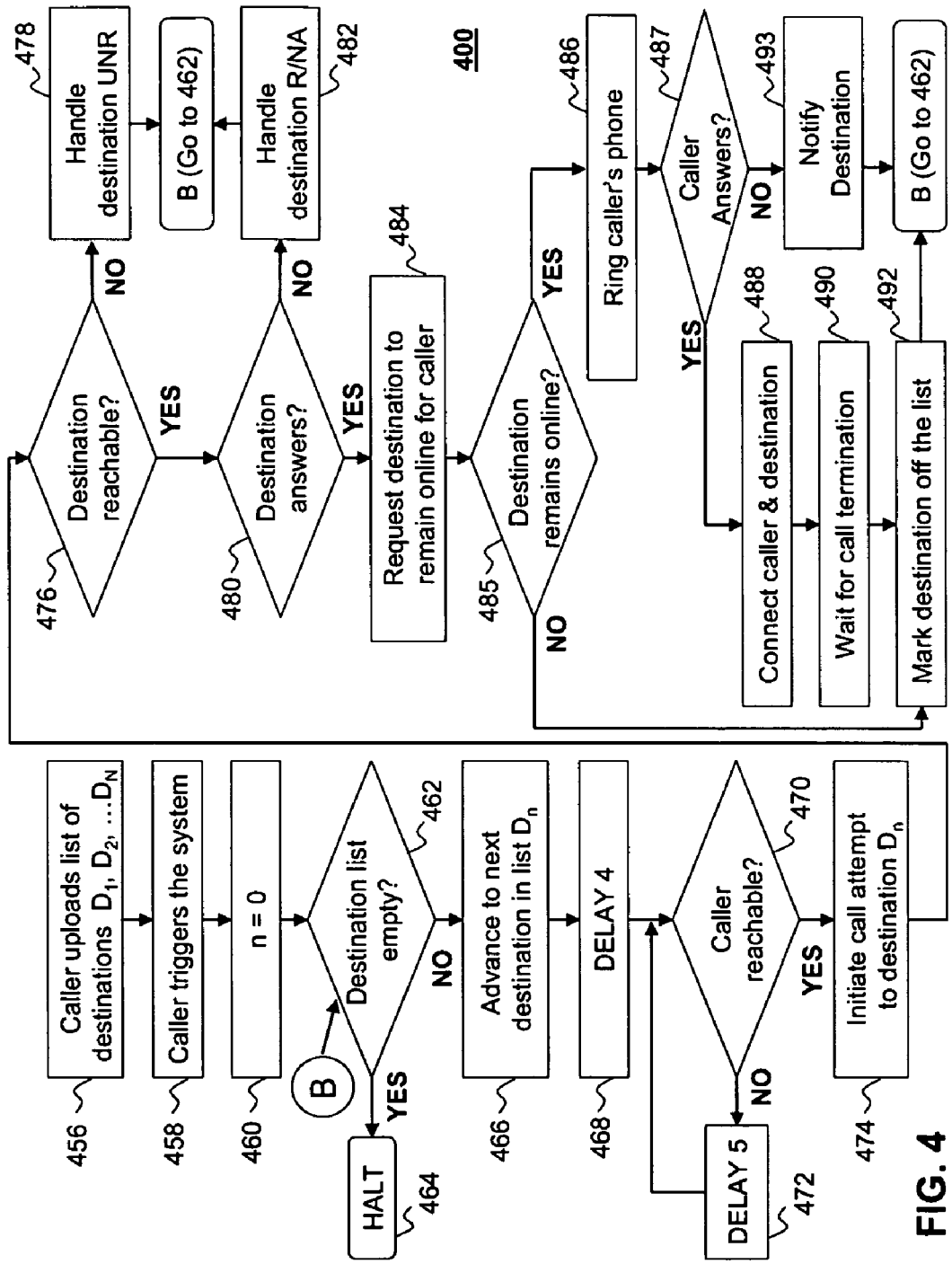
FIG. 4 depicts a flow chart illustrating a process for connecting a caller with a group of destinations wherein the connectability of a destination is determined first, in accordance with an embodiment of the present invention.

Referring to FIG. 4, a process 400 for connecting a caller with a group of destinations is provided. Process 400 determines if a destination is connectable first, prior to determining if the caller is connectable, when attempting to connect the caller with the destination. Process 400 can be implemented as a part of a VPA.

In step 456, a destination list having a group of destinations is received. For example, when process 400 is implemented in a VPA, such as VPA 240, a caller can utilize an interface on a user device such as on a personal computer 210D to upload a destination list to the VPA, which is executing step 456 of process 400 to receive the destination list. As described above, once the destination list is received by the VPA, it is saved in a data store and can be further edited by the caller or a delegated user. Alternatively, the destination list can be made available to a local VPA 240'.

In step 458, an indication is received to initiate attempts to connect the caller with each destination in the destination list. For example, a caller can trigger the VPA implementing process 400 by utilizing an interface on a user device such as on a cell phone 210C.

In step 460, a list pointer (n) is set to zero. A value of zero for the list pointer indicates that no attempts have yet been made to connect the caller with a destination. When the list pointer is set to a value x other than zero, the list pointer refers to the destination which is listed at position x in a destination list. As process 400 attempts to connect a caller with each destination sequentially in the order listed in the destination list, the list pointer is conveniently used to refer to the current destination in the call sequence as specified in the destination list. As noted above, other techniques for managing the state of destinations on the destination list can be used with equal advantage.

In step 462, a check is performed to determine if there are any remaining destinations in the destination list that needs to be connected with the caller. If the destination list is empty in the sense that there are no more destinations to be connected with the caller, process 400 ends at step 464. Otherwise, process 400 continues to step 466.

In step 466, the list pointer is incremented until the list pointer references the next sequential destination in the destination list that needs to be connected with the caller. If the list pointer in incremented beyond the last entry of the destination list, the list pointer is set to zero, in a cyclic manner, and incremented sequentially until the list pointer refers to the next destination in the sequence that needs to be connected with the caller. Upon completion of step 466, the list pointer refers to the current destination for which attempts will be made to connect with the caller.

In step 468, process 400 pauses for a specified period of time, referred to as Delay 4, to enable the caller to rest and handle incoming calls and additional outgoing calls. The time period for Delay 4 is configurable by the caller utilizing an interface on a user device and includes a zero time delay setting, if desired. Alternatively, the pause at step 468 can be a loop that waits for a command received at the user interface to proceed with placing a call to the next destination in the destination list.

In step 470, a check is performed to detect whether the caller is reachable. If the caller is reachable, process 400 continues to step 474. Otherwise, process 400 pauses in step 472 for a specified period of time, referred to as Delay 5, before performing another check in step 470. The time period for Delay 5 is configurable by the caller.

In step 474, a call attempt is initiated to the current destination. Steps 474, 476, 480, 484, 485, 486, 487, 488, and 490 of process 400 represent different phases of the call attempt initiated in step 474.

In step 476, a check is performed to detect whether the current destination is reachable. For example, a current destination is reachable if the call attempt initiated in step 474 is detected as being routed to the destination's phone. If the current destination is reachable, process 400 continues to step 480. Otherwise, process 400 handles the situation of an unreachable destination in step 478 utilizing one of various techniques aforementioned with regard to unreachable destinations. For example, the VPA implementing process 400 can automatically apply for a call completion service as described above. Furthermore, as described previously, the current destination can be permanently or temporarily marked as being removed for further connection attempts. After step 478, process 400 continues to step 462.

However, if the current destination is reachable in step 476, then the call attempt will be routed to the destination and the current destination's phone, for example, will start ringing. In step 480, a check is performed to determine if the destination has answered the call attempt. If the destination answers the call, process 400 proceeds to step 484. Otherwise, process 400 handles the situation of a ringing but not answering (R/NA) destination in step 482 utilizing one of the various techniques aforementioned with regard to reachable but not available destinations. For example, an R/NA destination can be handled similarly to the manner in which an unreachable destination is handled as described above in step 478. Thereafter, process 400 proceeds to step 462.

In step 484, the current destination is requested to wait online for the caller. The caller is identified by name, phone number, or any other identifier.

In step 485, a check is performed to determine whether the current destination is remaining online for the completion of the call attempt. If destination remains online, process 400 proceeds to step 486. Otherwise, process 400 continues to step 492.

If the current destination remains online, the caller is called in step 486 by, for example, ringing the caller's telephone. In step 487, a check is performed to determine if the caller has answered the phone. If the caller has answered the phone, process 400 proceeds to step 488. Otherwise, process 400 continues to step 493.

If process 400 reaches step 493, the caller is determined to be non-answering even though the caller was found to be reachable in step 470 prior to initiating the call attempt in step 474. Accordingly, this condition should be rare. In step 493, process 400 apologetically notifies the current destination that the call attempt could not be completed because the caller is unconnectable. Thereafter, also in step 493, process 400 disconnects the call to the current destination and proceeds to step 462 to handle the next destination in the list. Rather than trying again to complete the call to the current destination, an attempt to connect the caller with the next destination is performed first to avoid repeating with the same destination the unfortunate circumstance of asking the current destination to remain online only to discover that the caller is again not answering.

In step 488, the caller and the current destination are connected to allow the caller and the destination to communicate with each other. The caller and the current destination can be connected, for example, by relaying the caller's communication to the destination and vice versa.

In step 490, process 400 waits for the call between the caller and the destination to terminate. For example, process 400 can monitor the connection between the caller and the destination and wait until a disconnect is detected. In step 492, the current destination can be marked on the destination list as no longer requiring any further attempts to be connected to the caller, for example, whenever the disconnect is a natural call termination and not a termination due to a lossy signal, service, power, or the like. Thereafter, process 400 proceeds to step 462.

After each of the destinations in the destination list has been processed by process 400, any destination that was unreachable or unavailable and not properly handled by a call completion service can be re-marked as requiring additional connection attempts at step 462 at the direction of the caller. Thereafter, process 400 continues to step 466 to subsequently retry such destinations. A destination that was unreachable or non-answering may not have been properly handled by a call completion service, for example, if the destination did not offer any call completion services or offered only call completion services that were unacceptable to the caller.

It is to be noted that the above embodiments are described with reference to the most general types of communication networks with minimal functionality. In cases where one or more networks linking a caller and a destination provide more advanced features, these embodiments can be implemented to exploit them. For example, if the caller and the destination are on a network that provides continuous reachability monitoring, "caller-first" and "destination-first" embodiments can be implemented to check if at least one of the caller and destination is reachable prior to calling either the caller or the destination. In another example, in networks that allow for advanced call completion profile determination, such as the one described in the aforementioned U.S. Provisional Application No. 60/706,224, such advanced call completion services can be utilized to handle situations in which the caller or the destination is unreachable or not answering.

The steps described herein and the operation of the VPA can be event driven and not follow the precise order of steps shown in the flow diagrams. The flow diagrams are provided for illustrative purposes to conceptually document the functionality and operation of the various embodiments that can be implemented in accordance with the present invention.

The above discussion primarily concerns the placing and receiving calls through the VPA. A further feature of the present invention concerns the manner in which information (e.g., call destinations) is transferred to the VPA.

Figure 5:
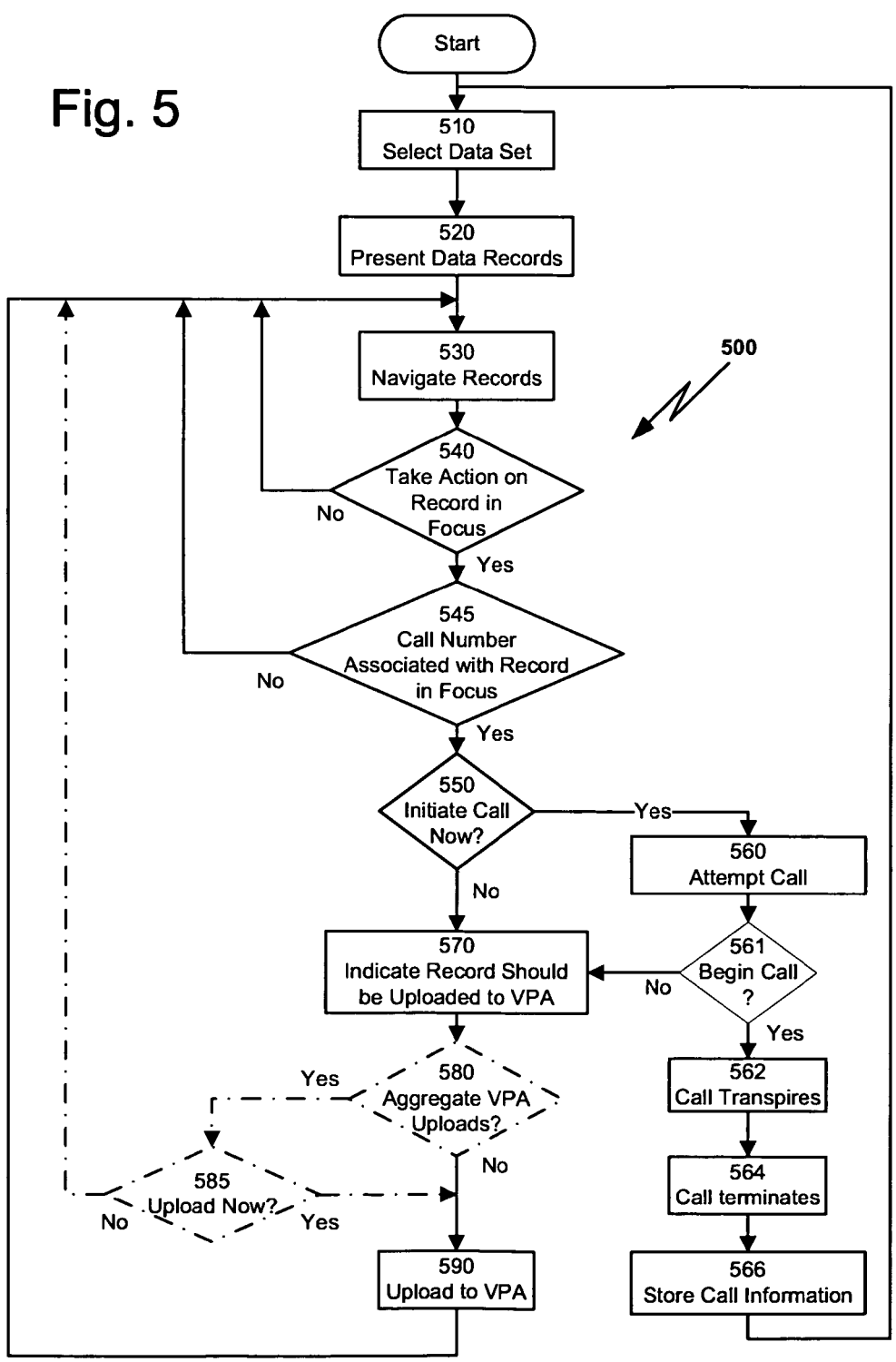
FIG. 5 depicts a flow chart illustrating a process for uploading information from a user device to the VPA, in accordance with an embodiment of the present invention.

FIG. 5 illustrates a process by which the user can browse information stored on the user device and selectively upload information to the VPA. The user begins by selecting a dataset through which to browse at step 510. The dataset can be included in a database, an in-memory data structure, a flat-file or other known data storage technique. Once the dataset has been selected, the user is preferably presented with a list of data records at step 520. Optionally, the dataset can be broken into one or more hierarchical categories. The user can navigate to the desired category so as to view the data records in the desired category. The data set can comprise one or more contact records, each including information sufficient to complete a call with a destination, and, preferably, including further information to identify to the caller the particular destination being called by the VPA or a person or company associated with that destination.

As mentioned above, the dataset browsed by the user at step 510 can include a phone book or address book. Alternatively, the dataset can include a call history, which can be divided into subcategories based on metadata such as call date, call direction (i.e., incoming or outgoing), and call status (i.e., missed or received). Similarly, a user's SMS history or log can be browsed by the user to select data for upload to the VPA.

It should be noted that datasets are not limited to conventional lists or repositories of contact and phone number information. That is, data records of a data set can include any collection of data that incorporates contact information, or that can be associated with contact information. For example, an email can be a dataset in the context of the present invention, in that contact information, call destination, or data record can be embedded in email (e.g., plain text, hyperlink, electronic business card, or metadata). A VPA-enabled email reader (i.e., an email reader configured to communicate with the VPA such as an SMTP-compliant interface), whether on a cell phone 210C, personal computer 210D, or other user device 210A-210D, can interpret the data contained in the email, recognize contact information or data record and present the information to the user or enable the user to browse the data records contained therein.

If contact information is embedded directly in the email, the VPA-enabled application can associate the contact information with an icon or otherwise indicate that the contact information can be uploaded to the VPA. Alternatively, if the contact information is not directly embedded, but the email includes data that the VPA-enabled application recognizes as contact identifiers (e.g., a person's name or email address), the email reader can look up the contact identifier in another application such as an address book, directory server, or network search engine to retrieve the associated contact information. Once the contact information is retrieved the contact so-identified can be associated with an icon or otherwise marked to indicate the contact information associated therewith can be uploaded to the VPA.

Nearly any document or application that can be stored or accessed by a user device, such as a computer or PDA, can incorporate contact information and thus be utilized to upload information to the VPA. Other examples of datasets include word processor documents, electronic mail messages, slideshow presentations, graphic images and/or video, instant messages, web pages and other compilations of data. Each of these datasets can embed or reference contact information (e.g., contact records) which can be navigated and selected by the processes described below so as to be uploaded to the VPA. Thus, in accordance with certain embodiments of the present invention, a user can schedule calls to be made, for example by clicking an icon on a web page to upload the number to the VPA.

Data records can be navigated using the appropriate interface device associated with the user device. For example, a cellular telephone may include a directional-pad or a touch sensitive screen which allows a user to select records. Alternatively, a mouse or keypad can be used in conjunction with a personal computer or similar device. Optionally, the numeric keypad associated with a cellphone can be used to search or browse data records by associating each number with one or more letters (e.g., pressing "2" once indicates the letter "a", pressing "2" twice indicates the letter "b", and pressing "2" three times indicates the letter "c"). If the device is equipped with voice recognition capabilities, the data records can be browsed and selected using a verbal interface provided using voice recognition.

If the data records are browsed using a directional pad, the user can navigate to each consecutive record at step 530 such that the system is focused on a particular record. As used herein, a record is "focused" upon when it is pointed to or highlighted by the active software program that is being used to browse the data records. At the interface level, the focus can comprise distinguishing one data record from the others. Within the executing program, the distinguished record is identified, as compared to any other records, as one that can be selected for purposes of being operated upon later or operated upon at that moment (e.g., the one-click operation of FIG. 6.)

Alternatively, if the user is browsing a dataset that is embedded in a document or application, the user can navigate the records as discussed above (i.e., browsing the available records so as to change the focus of the software) or by using a point-and-click type interface (e.g., computer mouse, touch screen, or PDA stylus).

At decision 540, the user can evaluate the focused record and determine if an action is desired. If an action is desired, the user can determine whether a call should be placed to the destination at step 545. If no call is to be placed the user can proceed with another action. However, if a call is to be placed, an instruction is input to the user device at step 550, such as in response to a prompt to make a choice, and depending on the value of the instruction the user can cause the device either to place a call immediately or to upload the call destination associated with the particular record that is in focus to the VPA for handling. Thus, the logic governing the interface provides the user with a choice of immediate or scheduled (delayed) call services.

If the call is to be placed immediately, the user can initiate the call in a conventional manner. For example, when a user presses the "SEND" button on the phone at step 560, the system dials the phone number associated with the data record which has been focused on by the system and attempts to complete the call. If the call begins, as tested at step 561, then the call transpires during step 562 and is terminated at step 564. Optionally at step 566, the user device can store information concerning the call (e.g., date and time initiated, dialed number, duration, etc.). The call information can also be automatically or selectively uploaded to the VPA by selecting it from the data set at block 540 the next time that the data records are presented to the user through the interface at block 520.

If, however, at step 550 the user desires to delay the call or schedule it for later, in accordance with an aspect of the invention, the user can indicate this preference to the system at step 570. For example, a soft-key (i.e., a button, located on a display device that performs the function shown near it on the display) can be assigned to indicate a delayed call to the number presently in focus. Alternatively, while the particular data record is in focus, the user can enter a menu system and navigate to the appropriate option associated with the desired action. In a further alternative, a hot-key can be associated with the desired action. Other user-interaction techniques known in the art can be used at step 570 to indicate that the call should be delayed or scheduled.

In the event that the user has indicated that the data record that is presently in-focus is to be handled by the call connection service, then a software routine comprising code executes in response to the user's interaction with the interface at step 550. In particular, the indication provided by the user through the interface operates upon that data record to acquire a portion of it which includes information sufficient to permit a call completion with the destination associated with the particular call record. The routine operates on the acquired portion of the data record so as to place it in a format suitable for handling by the call connection service. For example, it is arranged so that it identifies the user's phone number (the caller), the destination phone number, and optionally other information and metadata, such as the particular destination list, that call destination's place in the list, data taken from entries in an address book associated with that number of from other stored or in-memory locations, and the like. In part, the routine can operate to extract embedded call destination information from the data record, as described above. Thereafter, the portion can be uploaded to the call connection service, as indicated at step 590.

In one implementation, the code executes in the processor of the user device. In accordance with this arrangement, the user device defines a user-driven engine that responds to navigation selections with operations upon data records and/or their contents for uploading to a call connection service.

In other implementations, the code can execute in the processor associated with a network server. In this arrangement, the user device provides a navigation interface and engine to select a record and initiate execution of a software routine in the processor to respond by uploading records indicated by the user as having been selected to the call connection service. The network server is in communication with the call connection service so that the uploading can be performed. As will be appreciated, although the user device can have a processor, that processor is not executing the routine in this latter implementation. There are a variety of services that can be implemented in this way. For instance, the network server can be a voice mail server in which case the selected record is a voice mail. Similarly, the network server can be a document or another file server, with the user device causing navigation of records on the server and indicating to the server that the routine should execute so as to acquire at least a portion of data from the server. In emerging communications technologies such as interactive voice response systems in which voice channels can be used to communicate incoming-call metadata rather than control channels, cellular voice over Internet protocol (VoIP) systems in which calls can be conducted potentially without informing the destination device of the caller's number, and personal computer-based communications programs in which a call connection service can be accessed or initiated by interacting with icons as may be provided through a hosted website, the underlying information that is required in order to enable the call connection service to make the return call may not reside on the user device and in each of these technologies a server-based routine can be executed in response to indications provided through a user device.

As noted, information uploaded to the VPA can include various details regarding the call destination. For example, the identity of the call destination (i.e., the person or business associated the call destination) can be included in the information uploaded. Optionally additional contact information can be uploaded to the VPA such as address, email address, and alternative call destinations (e.g., mobile phone number or work phone number).

Optionally, information to upload to the VPA can be aggregated. Whether aggregation of data occurs can be determined by a user-setting, system setting, or interactively queried. If the information is to be batch uploaded, the indication that the call should be delayed at step 570 marks the data record or associated information for later processing. Thus, at step 580 the system determines uploads are to be aggregated, and, if at step 585 the system determines uploads should not yet occur, the user can proceed to step 530 so as to continue to navigate records and select various data records by repeating steps 530 through 570.

At step 580, the system can determine whether data should be aggregated before upload. This determination is preferably made by examining a user-customizable setting or interactive user-query. Alternatively, system or network test-criteria can be evaluated as well. For example, if the user device is currently unable to communicate with the network 230, the system can automatically switch to aggregated uploads until network communication has been restored.

At step 585, the system determines whether to upload aggregated data or continue to collect data. The determination can be based on user input, system input, or test criteria. For example, the system can prompt the user at step 580 to determine if the aggregated data should be uploaded. Alternatively, the system can assume data is not to be uploaded until the user navigates an options menu and selects the upload action. In a further alternative, the system can determine that a predetermined number of records have been queued or that a predetermined data size threshold has been satisfied and initiate the upload in response to such determination(s). Further, the elapsed time since the last upload can also be inspected and factored into an automated determination of whether to upload data. Once the upload determination has been made, the system uploads the data to the VPA at step 590.

It should be noted that the user can preferably exit the data selection process at any time. Once the user indicates the desire to exit the process (e.g., by pressing "END" or "quit") the system preferably immediately proceeds to step 590 to upload any data that has not been transmitted to the VPA. Uploading selected data records can be performed as a background process while the user can navigate the interface and take other actions.

The selection and uploading of information to the VPA can be used with nearly any set of stored data. As discussed above, call logs, phone books, and SMS logs can be navigated by the user on the user device, and thus lend themselves to application of this process of selection and uploading data. However, the present invention is not limited to data sets that can be visually displayed, nor the manual selection of data sets, nor data sets that are stored on the user device itself.

For example, a voicemail system accessed by a user and associated with the VPA can also be used to select and upload data to the VPA. The data set can include the voicemail messages stored in the system, and each voicemail comprises a data record. The user can navigate the voicemails at step 530. Once the voicemail browser application is focused on a particular message, the user can optionally play the message, and determine whether a call should be initiated to the sender at step 545. If the user does not want to return the call immediately at decision 550, the user can select the message so that caller information associated with the caller is uploaded to the VPA at step 590.

Regardless of whether the voicemail data is stored on the user device or on a separate server, the information contained therein can be explored and transmitted to the VPA. If the voicemail is stored on a server that is separate from the user-device, the device can browse the data on the server. Once the desired data is found, the user can select the associated record and indicate that it should be uploaded to the VPA. Alternatively, when the user accesses the voicemail server from the user device, a portion or all of the associated voicemail data can be transferred to the user device. This data can include the voicemail message itself as well as the date of the call, the phone number of the caller and/or other identifying information stored on the server. Further this data can be transmitted in chunks (i.e., divided into multiple pieces), as needed (i.e., on demand or pre-fetched).

Once a voicemail record is selected such that user has indicated the caller information should be transferred to the VPA, the transfer can be performed by a routine in various methods. If the voicemail data is being browsed by the user-device, user selection of a record can initiate a transfer of data from the voicemail server to the VPA. Alternatively, the data can be transmitted to the user-device, which optionally parses the data and retrieves additional data relating to the voicemail record, and then transmits the appropriate data to the VPA. However, if the voicemail server has previously transmitted portions of the data to the user device, the user device can optionally retrieve additional metadata from the user device's memory or the voicemail server, and relay the desired information (e.g., phone number and caller identification) to the VPA.

Figure 6:
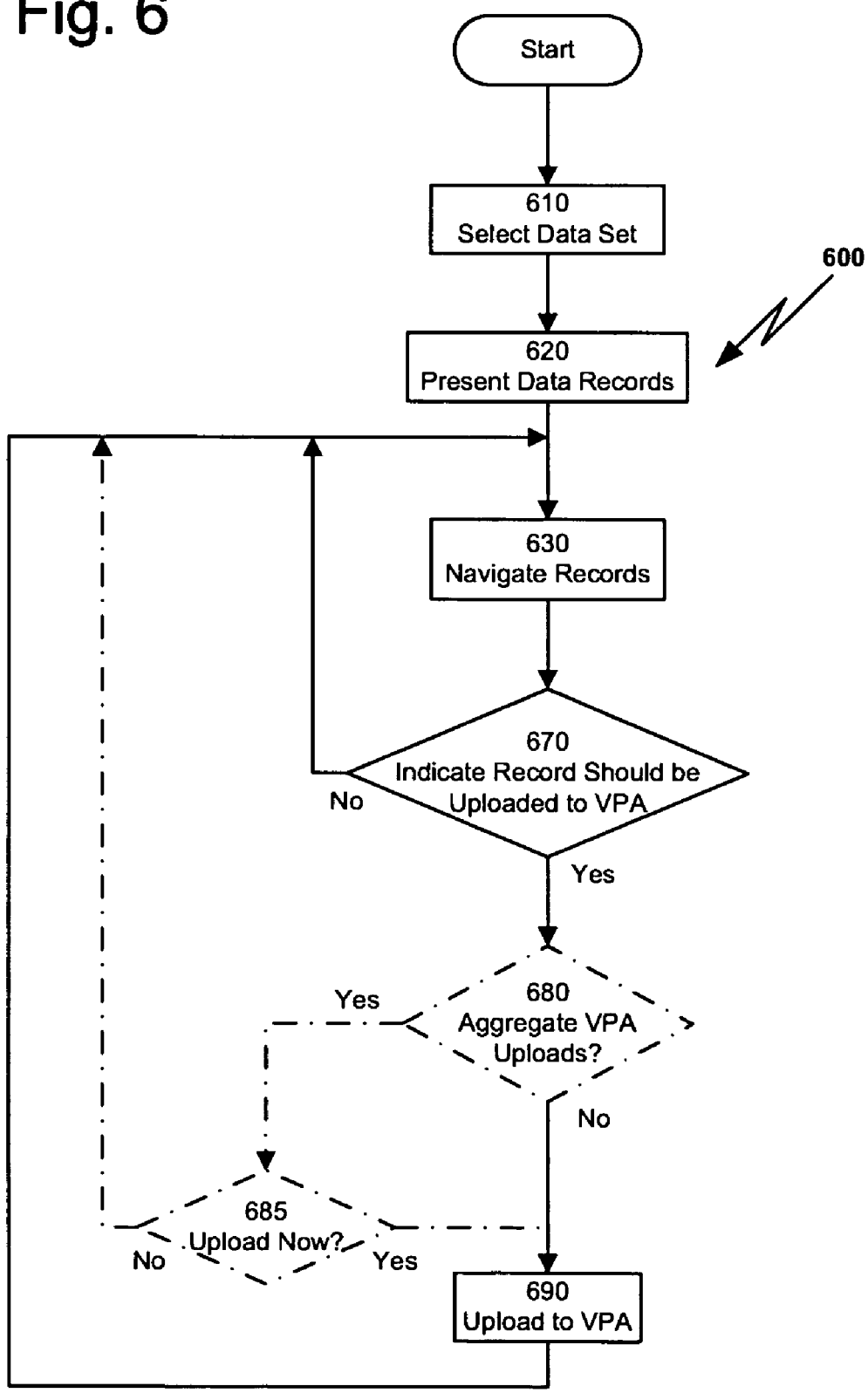
FIG. 6 depicts a flow chart illustrating a further process for uploading information from a user device to the VPA, in accordance with an embodiment of the present invention.

As illustrated in FIG. 6, the user can also load information and/or phone numbers to the VPA with a single-interaction (i.e., one-touch). That is, while browsing a data set stored on the user device, the user can press a single button, or provide some other user input such as voice command, to indicate the data record currently in focus (e.g., highlighted) by the system should be uploaded to the VPA.

The user proceeds in a manner similar to that illustrated with respect to FIG. 5, except that the user under this methodology initiates a software task to upload operation of the data record to the VPA with a single action once the record is in focus. At step 610, the user selects the dataset to browse, and data records from the dataset are presented to the user through the user interface at step 620. As discussed above, the data records can comprise a compiled set of data records such as a set of contact records having information which is sufficient to permit the VPA to complete a call with a destination, and optionally having further identifying information. The user navigates the data records at step 630, for example by using the up and down arrow keys to scroll through the entries in the user device's phonebook.

As the user interface focuses on each data record, the user can indicate that the particular record should be uploaded to the VPA. This indication can be provided by a soft-key or hot-key that is assigned to the process of uploading the number to the VPA. Thus, once the data record of interest is focused on by the system, the user can upload it to the VPA with a single key press or user interaction. Thus, while browsing the phone book or other dataset, the user is not interrupted by the process of uploading information to the VPA.

Further, if the dataset being navigated includes embedded or referenced contact information, as discussed above with respect to emails, word processing documents, images, etc., a point-and-click-interface, touchscreen interface, or compatible interface can be used to focus or select a data record. For example, while browsing a word processor document, a user may encounter an icon or highlighted text that indicates contact information associated therewith. The user can click on an icon or highlighted text to upload the associated contact information to the VPA.

Additionally, as discussed with respect to FIG. 5, at steps 580-590 data uploads to the VPA optionally can be aggregated in the one-touch process. Thus, at step 680, the system can determine whether records should be aggregated. If not, the information is uploaded to the VPA at step 690. However, if data is being aggregated for upload, the system proceeds to step 685 to determine whether the upload should occur immediately.

Optionally, an indicator (e.g., an icon on the user display) can be associated with the data record and displayed to the user to indicate the status of the data record with respect to being uploaded to the VPA. For example, one icon, such as a clock, can indicate that the data record is scheduled to be uploaded to the VPA, but the upload has not yet occurred. A second icon, such as a check mark, can indicate the upload has successfully occurred.

Figure 7:
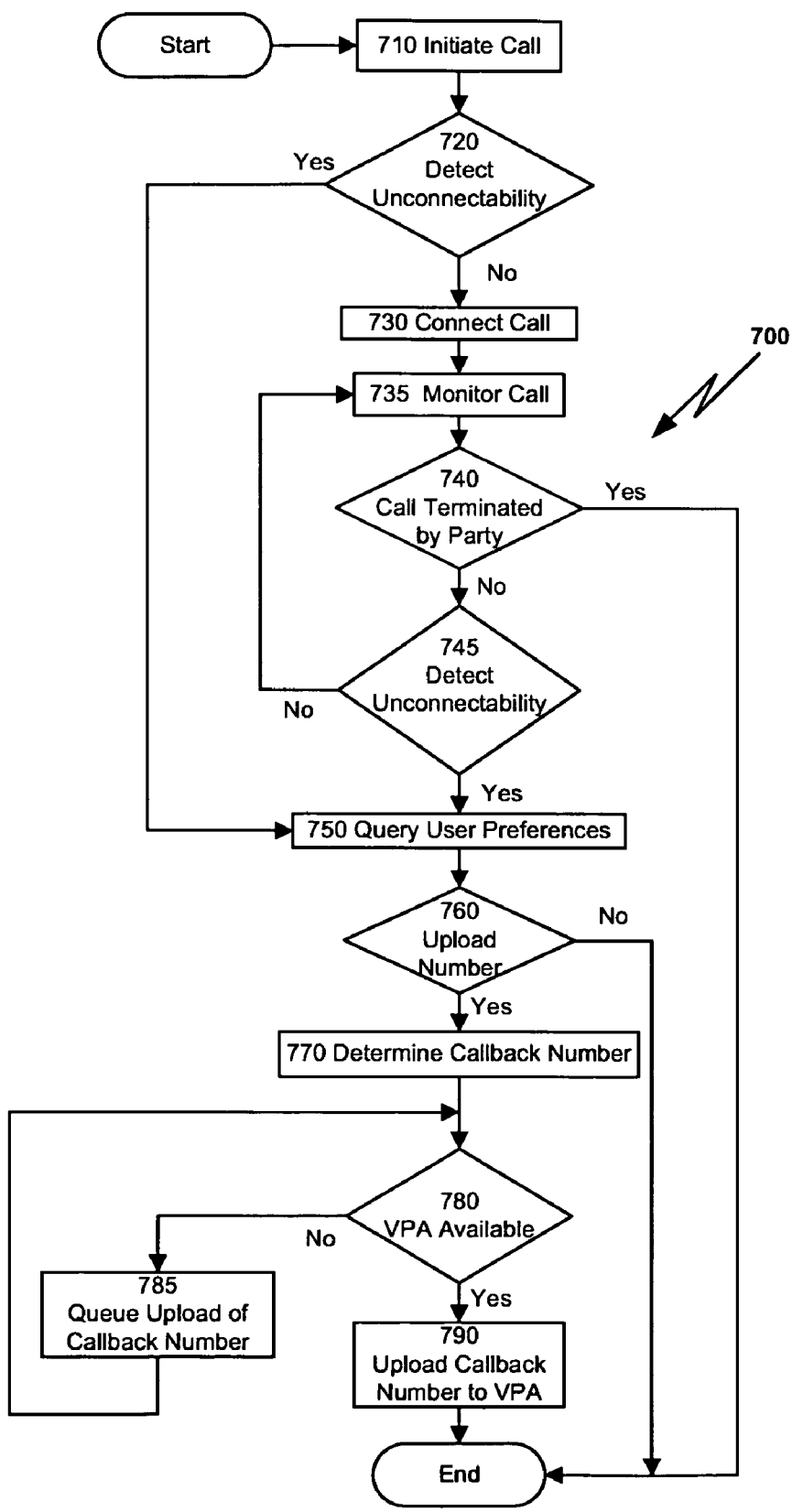
FIG. 7 depicts a flow chart illustrating a further process for uploading information from a user device to the VPA during a call process, in accordance with an embodiment of the present invention.

Information can also be transferred to the VPA in response to an unconnectability condition, such as a dropped call or an unconnectable call that is detected during a call process. FIG. 7 depicts a flow diagram illustrating a process 700 in accordance with an embodiment of the present invention. It should be noted that the following discussion of FIG. 7 is generally applicable with respect to devices associated with both parties to the call. That is, the device associated with either the party initiating the call or the party receiving the call can detect an unconnectability condition and respond appropriately. A discussion of various exemplars specifying the actions of each party follows the general discussion of FIG. 7.

A call process can be started when a calling party initiates a call with a destination, as illustrated at step 710. That is, the process begins when a user attempts to create a connection with a destination. The destination is typically associated with a phone number and optionally with additional information associated with the party (e.g., name, address, email address, other phone numbers, etc.). The user can dial the phone number manually, or retrieve a phone number from a data store (e.g., an address book) by looking up a destination identifier, such as a name.

At step 720, an unconnectability condition can be tested and detected. An unconnectability condition in the context of this particular step tests whether a call is not connectable (i.e., the caller and the destination can not communicate over the network) or whether the destination has failed to complete the connection (i.e., to answer the phone). Thus, the unconnectability being tested can be a result of various factors such as a network route between parties, insufficient bandwidth between parties, as well as whether a call can be connected given a user's preferences concerning when, where and to whom he or she wishes to talk. As discussed above, it is more assured to detect unconnectability, and so that is the preferred condition being tested, namely, the unconnectability of the calling party to the destination party.

The unconnectability can be detected by either the calling party or the destination party. For example, the calling party can determine that the destination was not reachable over the network or did not answer the call and thereby detect the unconnectability condition. Alternatively, the destination can detect that a call was missed (or ignored) and thus, detect the presence of an unconnectability condition.

In a more advanced example, when a call is placed to a destination, the network or destination device can query user preferences to determine the availability of the destination. User preferences can include data identifying any times during which the destination party is unwilling or unable to accept calls. That is, user preferences can specify "black-out" times during which any incoming call is not completed but instead uploaded to the VPA for later connection at a more convenient time. User preferences can be further linked or associated with a user's electronic calendar. That is, the VPA can query a user's electronic calendar to determine when the "black-out" times occur. In accordance with this feature of the invention, a user can schedule when calls should not be connected but uploaded to the VPA in a manner similar to scheduling an electronic calendar. Optionally, a user can indicate whether other scheduled appointments (e.g., doctor appointments, business meetings, etc.) are black-out times.

User-preferences can also specify which calling parties should not be connected but automatically uploaded to the VPA. For example, a user can specify that a call from his or her spouse should never be automatically blocked, but calls from co-workers should not be connected but uploaded to the VPA. The blocking of specific parties can also be used in conjunction with "black-out" times such as by blocking calls from all parties except the baby-sitter during a social dinner.

Further, the network itself can inform the caller or destination that an unconnectability condition was detected. For example, after the caller initiates a call to the destination, the network, and the systems associated therewith, can determine that the call cannot be completed because there is no available route or insufficient bandwidth to connect the call. The network can then inform the caller or destination that the call could not be connected. Alternatively, if either the caller or destination are not in communication with the network when the unconnectability condition is detected, the network can queue or delay informing the unavailable party of the detection of the unconnectability condition. For example, if a user places a call (i.e., the caller), but before the call can be answered, the user moves out of network communication (e.g., while driving), the network must queue or delay notification to the caller of the detection of the unconnectability condition under the caller is back in network communication.

If an unconnectability condition is detected, the process 700 proceeds to steps 750 through 790, which are discussed in detail below, to determine and take the appropriate and desired response. However, if there is no condition that would impede the call proceeding immediately, then the call is connected at step 730. The network(s) over which the call is connected typically monitor the call for various conditions at step 735. For example, a cellular telephone network can monitor the location and cell cite of the call parties. Further, the status of the call (i.e., whether the call was terminated and by whom or whether the call was dropped) can also be monitored.

Steps 735, 740 and 745 illustrate the processes that are ongoing during a call. That is, the call is monitored at step 735; the call can be terminated by one of the parties at step 740; and an unconnectability condition (e.g., the call being dropped by the network due to a lost signal, low/no battery power, etc.) can be detected at step 745. If the call is terminated by one of the parties to the call, then at step 740, the process typically ends. However, if the call has not been terminated by a user, the process checks for the detection of an unconnectability event at step 745.

While FIG. 7 depicts these processes in a linear fashion, one of ordinary skill in the art would recognize that these processes can occur in a multi-threaded or multi-process environment. For example, a call monitoring thread can post an event indicating that a status change in the call has occurred. A separate thread can process the event and determine which conditions have been satisfied and initiate the appropriate actions. Alternatively, multiple processes can be dedicated to monitoring the call for specific events and event handling.

If an unconnectability event is detected at step 745, such as the call being dropped by the network, the user can be queried at step 750, optionally through the user device, to instruct the device as to whether a call back number should be uploaded to the VPA. Alternatively, at step 750 one or more user preferences can be queried to determine whether the user has previously configured the device with actions to take in response to the unconnectability event. That is, user preferences can be used to determine whether to upload a call back number to the VPA. User preferences can be encoded or stored in a configuration file that is maintained on the user device (e.g., phone) or on the network system components (e.g., a network server). The user preferences that are examined can include various factors such as the date and/or time of the call process, the identity and/or number of the destination or caller, the type of unconnectability event detected, whether the user is the caller or the destination, and whether the VPA is available (e.g., in network communication with the user device).

If it is determined at step 760 that the callback number is not to be uploaded to the VPA, the process 700 can end. However, if the determination at step 760 is to upload the callback number, the process 700 determines the call back number at step 770. The callback number can include the phone number of the other party to call. Alternatively, a callback number that is either known to the network, stored in the address book, or transmitted with the call can be specified. For example, when a caller initiates a call to a destination from the caller's cellular telephone, the signaling of the call can include that caller's callback number, which is different from the cellular telephone number, such as an office phone number. If the destination misses the call, the callback number specified in the call signaling (e.g., the caller's office phone number) can be uploaded to the destination's VPA. Alternatively, the destination can query the network or local address book to determine if the caller's cellular telephone number is associated with a different callback number, which can be uploaded to the VPA instead of the cellular telephone number. In a further alternative, if the destination does not answer, the caller can determine the callback number of the destination at step 770 by looking it up in the caller's address book, querying the network for the callback number, or receiving a callback number from the destination in the call signaling.

Once the callback number is determined at step 770, the party can upload the number to the VPA at step 790. Optionally, the party may not be in communication with the VPA. For example, if the call was dropped because the caller moved out of the cellular telephone coverage, the caller will likely not be able to communicate with the VPA for the same reason that the unconnectability condition arose. Thus, as step 780, the system can determine if the VPA is available. If the VPA is available, the callback number is uploaded at step 790. However, if the VPA is not available, the user device can queue or delay the upload of the callback number at step 785. The user device can periodically check for VPA connectability at step 780 and perform the upload at step 790 once the VPA is available.

Uploading the number to the VPA as part of an integral data record or directly from an ANI (automatic number identification) reduces the risk of human error and alleviates user inconvenience. That is, manually dialing a telephone number can be tedious and error-prone. Uploading the number to the VPA as part of an integral data record or directly from an ANI reduces the risk of incorrect number entry and reduces the inconvenience to the user.

It should be noted that either the caller or the destination can respond to an unconnectability condition during the call initiation process, for example by uploading the callback number to the VPA. By way of example, when a destination misses a call (e.g., due to being away from the phone or out of coverage), either the caller or destination can detect the missed call response. If the destination is not in communication with the network, the caller can respond by uploading the callback number of the destination to the VPA. However, the destination can also respond once network communication is restored. For example, the network can inform the destination of the missed call once communication is restored, and the destination can then upload the number to the VPA. Alternatively, the network can be responsible for uploading the callback number of the caller to the VPA associated with the destination even if the destination is not in network communication.

When a call is dropped, or some other unconnectability condition arises during a call initiation process, either the caller or the destination can upload the callback of the other party number to their respective VPA. For example, if the caller moves out of cellular coverage, either the caller or the destination can load the other party's callback number to the VPA. As discussed above with respect to steps 780 and 785, if the VPA is not available (i.e., out of network communication with) the caller, the caller can queue the upload for a later time when the VPA becomes available. Alternatively, the network can automatically upload the callback number to the VPA for the caller, and attempt to reconnect the call once the caller is again in communication with the network.

It should also be noted that the caller or destination can optionally upload their respective callback number to the other party's VPA. Whether a secondary party is permitted to upload information to a VPA not associated with the secondary party is preferably controlled by the user preferences of the user associated with the VPA.

Figure 8:
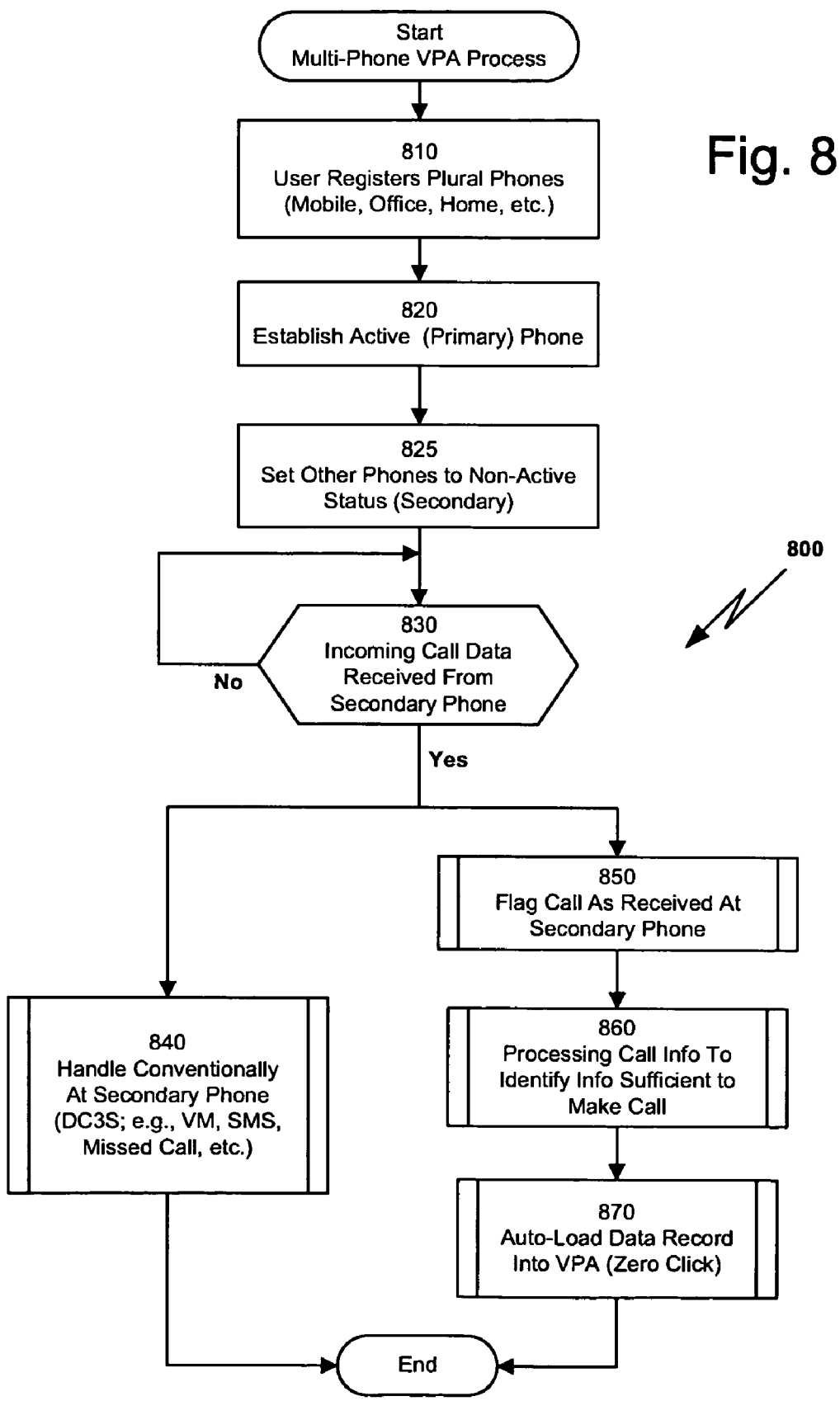
FIG. 8 depicts a flow chart illustrating a further process for uploading information received at a secondary (not-presently active) device to a VPA process associated with the user's primary (active) device, in accordance with a further aspect of the present invention.

Referring now to FIG. 8, a process 800 is described in accordance with still another aspect of the present invention in which the user of a call connection service (in this example a VPA but in the more general case an automatic dialer) has more than one telephone. This is a common occurrence in modern life in which a person has, for example, a telephone number at home and a mobile phone. For many people, there are three or more active phones, such as a home, office, car telephone, and personal cellular telephone. If the user has access to a connectivity service such as can be provided by the VPA code 240, then calls received to any of the user's telephones can be processed by automated agents to provide call-back assistance in accordance with process 800 and the user's preferences.

Existing technologies allow for a call received at the user's office while the user is away to be forwarded to the user's cellular telephone. Still newer techniques such as utilized by the Microsoft Office Communicator, available from Microsoft, Inc. of Redmond, Wash., allow the user to define the general times that office calls are to be forwarded to another telephone number, such as a cellular phone. However, at specific occasions an incoming call might be forwarded to user at a bad timing when it interrupts the user's activity (e.g., lunch, bathroom break, children's event, etc.). As a departure from these known processes, the process 800 automatically loads the callers' numbers into the stack of a call-back routine, enabling the user to return the call at a desired time, and ensuring that the call is not lost even if the user is busy or unavailable at the time of the original call.

At Step 810, a VPA user registers his or her various phones with a control system such as control system 200. Phones are registered with the user by associating each of the user's phone numbers with the control system. The association can be in the form of a data record that links the user's various phone numbers to the user or to one another. For example, the user can have two phone numbers, one associated with a mobile (e.g., cellular) telephone and one associated to a land line (e.g., at the user's office). The data record can link these phone numbers in a table or database or other storage structure so that a call made from any of these numbers, or a password provided to the control system, can trigger the connectivity service to begin calling numbers from a stored destination list as previously described, or can allow other user-management operations such as editing, augmenting or deleting one or more destination lists.

Optionally, code associated with the connectivity service can be loaded on each of the user's devices or on a machine that is connected so as to permit monitoring of calls to any of the user's devices. Moreover, the code, when executed, can cause communication among the devices to inform one another of their respective status (active, non-active, incoming call, call data to transfer, and so on).

At step 820, a user establishes a primary phone number, meaning that the control system is informed which of the user's phones lines is "active." The active phone line is the phone line on which user wishes to receive phone calls at the present time. Any other registered phones can be automatically identified as "non-active" at step 825 because the user is not near the phone or otherwise does not wish to receive calls dialed to that number. Depending on the control system used, the phone line being made active can send an announcement to the other devices registered with that user of its status, or the control system can send an announcement to all of the user's registered devices. The "active" phone is the user's primary phone until its status is changed. The "non-active" phones are not inactive, it is just that there is only one primary phone line at a time, and so the other devices associated with other phone lines are secondary phone lines until their status in the control system register is changed. The connectivity service (e.g., VPA code 240) can operate, in accordance with this aspect of the invention, to automatically load data records concerning incoming calls to any of the secondary telephone lines onto a destination list.

At step 830, a test is made to determine if incoming call data has been received from any of the secondary telephone numbers. Until incoming call data has been received, the process 800 loops at this step, it being understood that this process, if being executed, is only one of several ongoing threads being managed by a task manager at, e.g., a control system or a central office, as the case may be. In one implementation, the user has a connectivity service executing on each of the phones he or she has registered with the control system. In another implementation, the code is associated with a central control system rather than individual phones. In still another implementation, the service has code executing, in part, on user devices and, in other parts, from a central location.

When an incoming call is received at a phone number that the user has not designated as being active (i.e., a non-active or secondary phone line), the incoming call is handled at step 840 by a conventional call completion service, such as any of the processes on the right-hand branch of FIG. 1 (processes 110-113). At the secondary phone, and from the perspective of the caller, the call handling has been conventional. However, additional processes are taken automatically in response to the call received on the secondary phone line.

The call received on the secondary phone line is flagged at step 850 as having been received on a phone line that is not presently marked as being "active." The flagged call is processed to extract conventional information such as Caller ID (CLI/ANI) and DDI (MSN/DNIS). At step 860, the call information is processed so as to identify information sufficient to permit a return telephone call to the calling party, and optionally can include any of the other information that is available for extraction from or about the received call, such as the time and date of the call, whether a voice message was recorded, and a copy of the voice message. For example, the processing can construct a data record of the call information. The call information is then provided to the user's active VPA process at step 870, or to another connectivity service configured to assist the user in connecting with the caller. Each of the steps 850-870 proceeds without user intervention, and so a connectivity service implemented by the process 800 automatically loads new call information for each call received at a secondary phone line free of user action. This "zero click" process operates under program control in response to the call event being received at whatever telephone number is presently designated as secondary, and automatically constructs a destination list by augmenting an existing list or creating a new destination list with each call received at the secondary telephone line. At the primary phone or at any other device that he user can authenticate himself or herself to the control system, the user can access his or her connectivity service account and trigger the system, as is preferably tested by the connectivity service software, and once triggered causes the serial return of telephone calls in the resulting destination list, as described above in connection with FIG. 3., and in accordance with the user's availability and schedule.

In the process of FIG. 8, the call connection service can be conducted with the user providing a selection as to which to which of the plurality of telephone numbers is to be the primary number, with the receipt of that selection establishing the selection as the primary number, as may be stored with the call connection service. Any received incoming call data can be flagged as having been received at one of the secondary telephone numbers. The processing of any incoming call data can define a data record for use by the call connection service to make the return telephone call. The process can also include sending a notification to a user device associated with the primary number concerning the upload of the identified information to the call connection service. Likewise, the process of FIG. 8 can also provide an announcement to the user of any upload of the identified information to the call connection service.

It should be understood that the destination list managed by the VPA can be maintained centrally even if each of the user's phones is running a VPA process. The members of the destination list can be accessed from whichever phone is presently designated as the primary phone, and that can remain true even when the status of a telephone line is changed in the registry from active to non-active.

The present invention has been described in connection with certain embodiments and features which are intended for illustration of the general concepts disclosed and which are not intended as being a limitation on the scope of the invention. Rather, the invention is defined by the recitations in the claims set forth below, and each recitation includes within its scope equivalents of the feature being recited.

What is claimed:

1. A method for providing data to a call connection service through a user device having an interface, wherein the call connection service is remote from the user device, comprising:
   presenting one or more data records in a data set to a user in the interface, each data record being associated with a call destination;
   obtaining data navigation instructions from the user concerning a particular data record of the one or more data records;
   receiving an indication from the user to upload the call destination associated with the particular data record to the remote call connection service;
   executing a routine in response to the indication, the routine acquiring a portion of the particular data record and processing it into a format suitable for handling by the remote call connection service; and
   uploading the portion of the information to the remote call connection service in the format suitable for handling by the call connection service.

2. The method of claim 1, wherein the user device has a processor and wherein the routine executes in the processor of the user device.

3. The method of claim 1, wherein the routine executes in a processor associated with a network server and wherein the network server is in communication with the call connection service.

4. The method of claim 2, including the additional step, prior to receiving the indication to upload the call destination, of:
   acquiring an instruction from the user to initiate a call to the call destination,
   wherein the processor responds to the instruction by initiating the call to the call destination when the instruction has a first value and by uploading the call destination associated with the particular data record when the instruction has a second value.

5. The method of claim 1, wherein the uploading step uploads among the portion of the information metadata concerning the call destination.

6. The method of claim 1, wherein the data set includes at least one embedded call destination associated with the particular data record.

7. The method of claim 6, including the additional step of identifying the at least one embedded call destination, and wherein the step of presenting one or more data records to the user is performed so as to indicate the existence of the at least one embedded call destination.

8. The method of claim 7, wherein the one or more data records comprise at least one of an e-mail, a web page, an instant message, an SMS, a word processor document, a slideshow presentation, a spreadsheet, an address book, a contact list, and a graphic image, and wherein the identifying step identifies the embedded call destination by processing the data record.

9. The method of claim 1, wherein the one or more data records comprise at least one of an e-mail, a web page, an instant message, an SMS, a word processor document, a slideshow presentation, a spreadsheet, an address book, a contact list, and a graphic image.

10. A method for providing data to a call connection service in response to an unconnectability condition detected during a call process between a calling party and a destination party in which a call is dropped or is unconnectable, the call connection service being remote from the calling party and the destination party, the method comprising:

initiating a call attempt from the calling party to the destination party;

detecting the unconnectability condition by a remote server running the call connection service;

taking action in response to the detecting step for at least one of the calling party and the destination party, the course of action comprising:

obtaining a callback number; and selectively uploading the callback number to the remote call connection service for handling the call by the call connection service.

11. The method of claim 10, wherein detecting the unconnectability condition includes determining that the call initiation process between the calling party and the destination party was not completed.

12. The method of claim 11, wherein action taken for the destination includes obtaining the callback number of the calling party and uploading the callback number to the call connection service.

13. The method of claim 12, wherein the call connection service is associated with the destination party.

14. The method of claim 11, wherein the action taken for the calling party includes obtaining the callback number of the destination party and uploading the callback number to the call connection service.

15. The method of claim 14, wherein the call connection service is associated with the calling party.

16. The method of claim 10, wherein detecting the unconnectability condition includes determining that the call process between the calling party and the destination party was prematurely terminated.

17. The method of claim 16, wherein the action taken for the calling party includes obtaining the callback number of the destination party and uploading the callback number to the call connection service associated with the calling party.

18. The method of claim 16, wherein the action taken for the destination party includes determining the callback number of the calling party and uploading the callback number to the call connection service associated with the destination party.

19. The method of claim 10, wherein the step of taking action includes the additional step of querying at least one of the calling party and the destination party to determine whether the callback number is to be uploaded to the call connection service, wherein the uploading step is performed on the basis of the querying step.

20. The method of claim 10, wherein the step of taking action includes the additional step of examining a configuration of the at least one of the calling party and the destination party to determine whether the callback number is to be uploaded to the call connection service, wherein the uploading step is performed on the basis of the examining step.

21. The method of claim 10, wherein the step of taking action includes the additional steps of:

testing the unconnectability condition of the call completion service;

queuing the upload of the callback number in response to the testing step when the test results in a detection of an unconnectability condition; and otherwise performing the uploading step.

22. The method of claim 10, wherein detecting the unconnectability condition includes querying one or more preferences of the destination party.

* * * * *